(12) United States Patent
Groves et al.

(10) Patent No.: US 11,407,953 B2
(45) Date of Patent: Aug. 9, 2022

(54) PROCESSES FOR UTILISATION OF PURIFIED COAL COMPOSITIONS AS A CHEMICAL AND THERMAL FEEDSTOCK AND CLEANER BURNING FUEL

(71) Applicant: Arq IP Limited, London (GB)

(72) Inventors: Paul Groves, Loughborough (GB); John Francis Unsworth, Wrexham (GB)

(73) Assignee: Arq IP Limited, London (GB)

( * ) Notice: Subject to any disclaimer, the term of this patent is extended or adjusted under 35 U.S.C. 154(b) by 0 days.

(21) Appl. No.: 17/279,780

(22) PCT Filed: Sep. 27, 2019

(86) PCT No.: PCT/GB2019/052738
§ 371 (c)(1),
(2) Date: Mar. 25, 2021

(87) PCT Pub. No.: WO2020/065341
PCT Pub. Date: Apr. 2, 2020

(65) Prior Publication Data
US 2021/0332303 A1    Oct. 28, 2021

(30) Foreign Application Priority Data
Sep. 27, 2018   (GB) ..................... 1815791

(51) Int. Cl.
| C10L 9/00 | (2006.01) |
| C10L 5/04 | (2006.01) |
| C10L 5/36 | (2006.01) |
| B03D 1/02 | (2006.01) |

(52) U.S. Cl.
CPC .............. C10L 5/04 (2013.01); C10L 5/363 (2013.01); C10L 9/00 (2013.01); B03D 1/025 (2013.01); B03D 2203/08 (2013.01); C10L 2250/06 (2013.01); C10L 2270/04 (2013.01); C10L 2290/08 (2013.01); C10L 2290/24 (2013.01); C10L 2290/28 (2013.01); C10L 2290/30 (2013.01); C10L 2290/547 (2013.01)

(58) Field of Classification Search
CPC .... C10L 5/04; C10L 9/00; C10L 5/363; C10L 2290/28; C10L 2250/06; C10L 2290/08; C10L 2290/547; C10L 2270/04; C10L 2290/30; C10L 2290/24; B03D 2203/08; B03D 1/025
See application file for complete search history.

(56) References Cited

U.S. PATENT DOCUMENTS

| 4,255,155 A | 3/1981 | Frankovich |
| 4,420,445 A | 12/1983 | Yamamoto et al. |
| 4,671,801 A | 6/1987 | Burgess et al. |
| 5,242,470 A | 9/1993 | Salter et al. |
| 5,379,902 A * | 1/1995 | Wen ........................ B03B 9/005 209/166 |
| 9,777,235 B2 | 10/2017 | Snaith et al. |
| 2012/0317878 A1 | 12/2012 | Taulbee |
| 2016/0082446 A1 * | 3/2016 | Swensen ................... B03D 1/24 44/280 |
| 2016/0160141 A1 * | 6/2016 | Sakaguchi ............... C10B 57/10 44/608 |
| 2018/0134977 A1 | 5/2018 | Swensen et al. |
| 2018/0362870 A1 * | 12/2018 | Abbott ..................... F23N 5/003 |

(Continued)

FOREIGN PATENT DOCUMENTS

| CN | 108148610 A | 6/2018 |
| DE | 3200240 A1 | 7/1983 |
| GB | 2164271 A | 3/1986 |
| WO | 2017166920 A1 | 10/2017 |
| WO | 2017174973 A1 | 10/2017 |
| WO | WO-2017166920 A1 * | 10/2017 ........... C01B 32/336 |

OTHER PUBLICATIONS

WO2017166920 Description Translated (Year: 2017).*

(Continued)

*Primary Examiner* — Ellen M McAvoy
*Assistant Examiner* — Chantel L Graham
(74) *Attorney, Agent, or Firm* — Dinsmore & Shohl LLP

(57) ABSTRACT

A process for upgrading of a coal product is provided. The process comprising the steps of: (i) providing a purified coal composition, wherein the composition is in the form of solid particles, and wherein at least about 90% by volume (% vol) of the solid particles are no greater than about 500 μm in diameter; and (ii) combining the purified coal composition with a solid coal feedstock, in order to create a combined solid-solid blend upgraded coal product. Further a process for preparation of a purified coal product is provided. The process comprising the steps of: obtaining a starting material that comprises coal; subjecting the starting material to at least one fine grinding stage so as to reduce the starting material to a particulate composition in which substantially all of the particles are no more than 500 microns (μm) in diameter; exposing the particulate composition to at least one froth flotation stage so as to separate hydrocarbonaceous material comprised within the particulate composition from mineral matter, wherein during the at least one froth flotation stage the hydrocarbonaceous material is associated with froth produced and separated from the at least one froth flotation stage; washing the froth separated from the at least one froth flotation stage with water to release the hydrocarbonaceous material; and subjecting the hydrocarbonaceous material to at least one dewatering stage so as to obtain a particulate purified coal product that has an ash content of less than 12% m, a water content of less than 25% m and wherein the particles comprised within the particulate purified coal product have a d90 of less than 00 μm. Products, such as pelletized or briquetted coal, comprising purified coal material obtainable via the described processes are also provided.

18 Claims, 8 Drawing Sheets

(56) References Cited

OTHER PUBLICATIONS

WO2017166920 Bib Translated (Year: 2017).*
Baek et al., "The effect of the coal blending method in a coal fired boiler on carbon in ash and NOx emission", Fuel, IPC Science and Technology Press Guildford, GB, vol. 128, pp. 62-70, Mar. 6, 2014.
International Search Report pertaining to Application No. PCT/GB2019/052738 dated Feb. 6, 2020.
Search Report pertaining to Application No. GB1815791.7 dated Mar. 4, 2019.

* cited by examiner

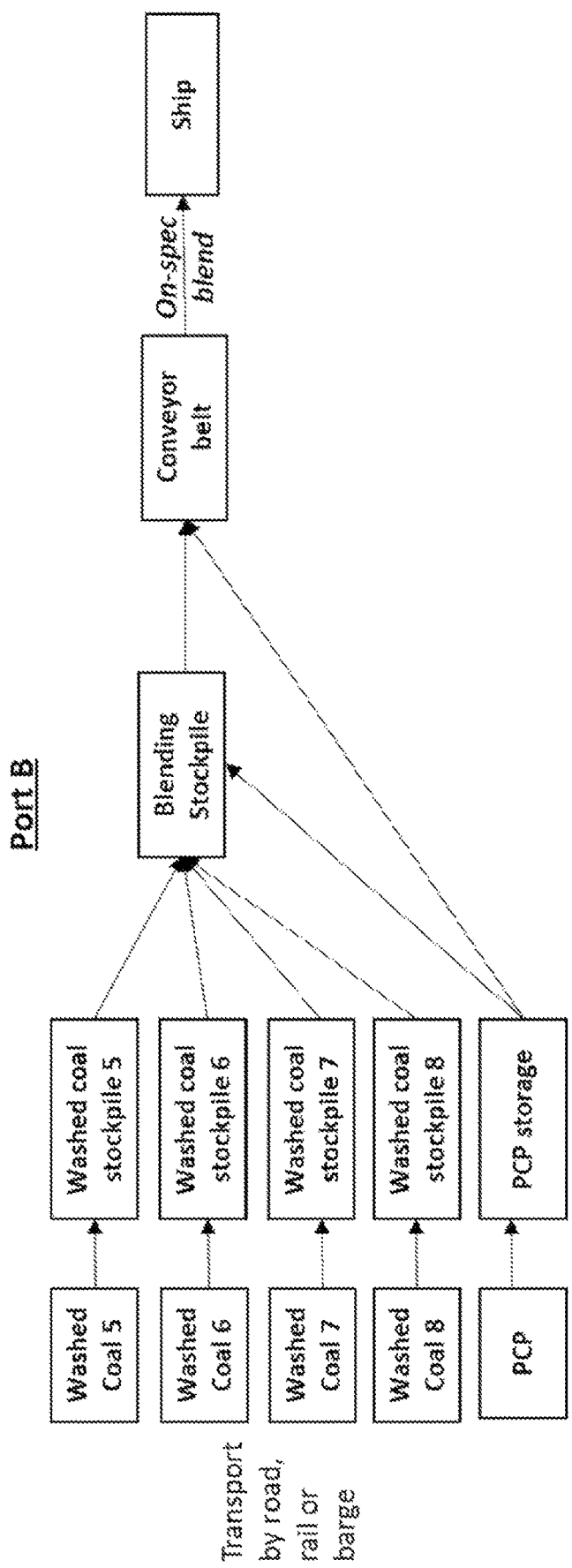
Figure 1 ( B )

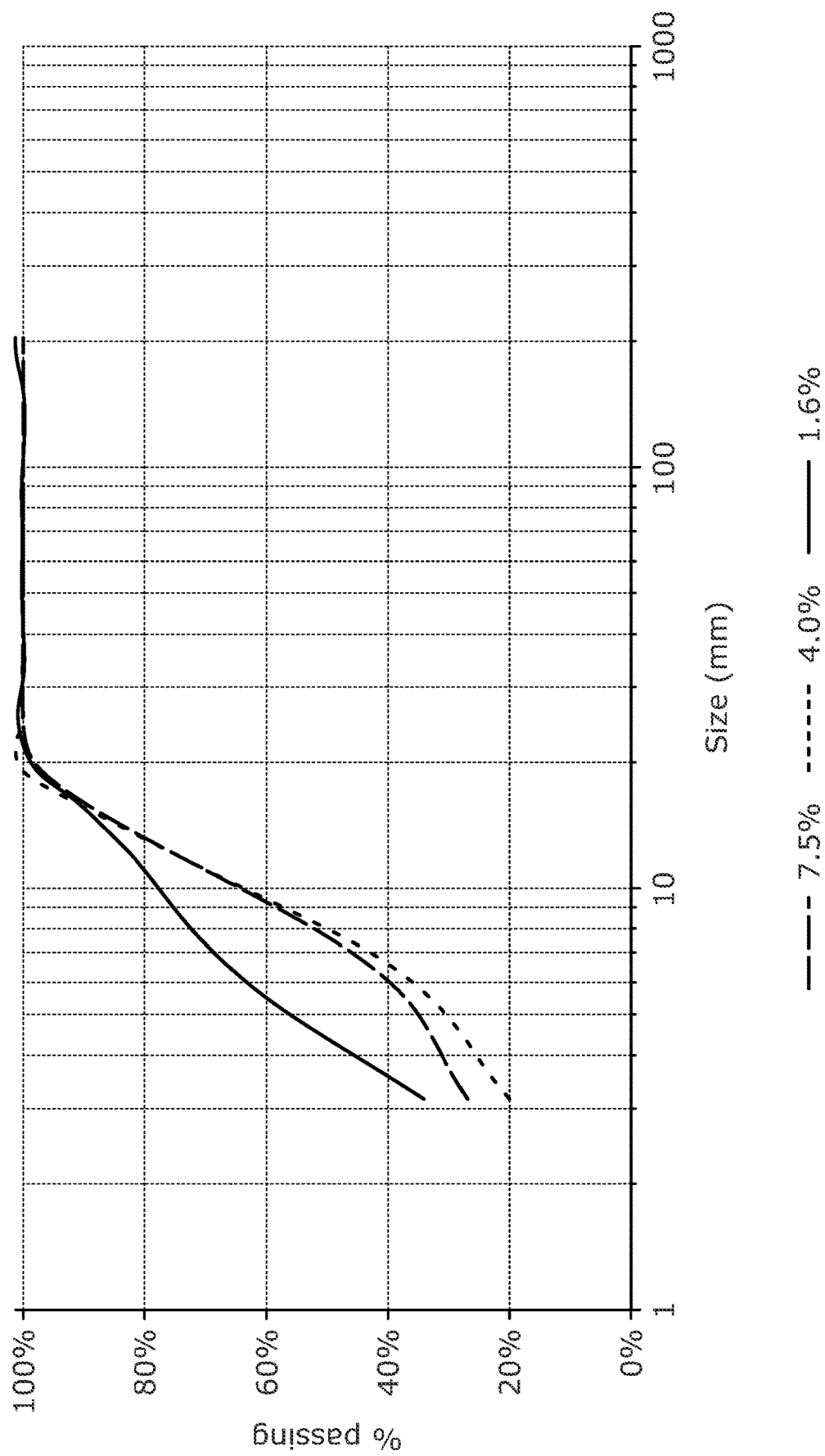

PROCESSES FOR UTILISATION OF PURIFIED COAL COMPOSITIONS AS A CHEMICAL AND THERMAL FEEDSTOCK AND CLEANER BURNING FUEL

This patent application is a national stage entry of International Application No. PCT/GB2019/052738, filed on Sep. 27, 2018, which claims the priority from United Kingdom Application No. 1815791.7 filed Sep. 27, 2018 and titled "Processes for Utilisation of Purified Coal Compositions as a Chemical and Thermal Feedstock and Cleaner Burning Fuel." Both of the aforementioned applications are hereby incorporated by reference in their entirety.

FIELD OF THE INVENTION

The invention is in the field of processing and utilisation of solid hydrocarbons, most particularly coal. In particular the invention is in the field of remediation and exploitation of waste coal fines derived from mineral extraction and mining activities.

BACKGROUND OF THE INVENTION

Coal mines, especially multi-seam surface mines and associated coal processing and preparation plants, are limited in output and market pricing by the availability of high grade quality seams necessary to meet high specifications for coking and pulverised coal injection (PCI) coals. These limitations are leading to lower and less efficient production of this important chemical feedstock from a rapidly diminishing worldwide resource base. Tighter product specifications for internationally traded thermal coals are also leading to lower, and less efficient, production in the coal industry. As a result of more demanding environmental standards, coal processing plants are increasingly also limited in their ability to store waste coal product in tailings ponds, impoundments or tips.

Thermal coals sold and traded internationally for power generation, are typically high ash content (at least 15-20% m dry basis), high sulphur content (1-2% m dry basis), moderately-high water content (10-15% m or higher) and with a relatively coarse particle size distribution (<50 mm). Coal power plant boilers utilise pulverised PCI fuel (i.e. dried coal particles, typically in the size range 20-120 µm) and consume significant amounts of energy in crushing, drying and pulverising thermal coals. The ash generated during combustion has to be removed either as slag ash or fly ash: in both cases ash reduces operational efficiency and incurs environmental as well as commercial costs for disposal. Power stations utilise flue gas desulphurisation techniques to minimise the emissions of sulphur oxides to the atmosphere; the cost of operating such desulphurisation techniques is proportional to the coal feedstock sulphur content.

Coal seams with high ash content are abundant worldwide, from numerous geological reserves, sometimes as thick seams persisting over a wide geographical area, but many are not exploitable economically due to the problems described above.

Coal fines and ultrafines, including microfines, are the small particles of coal generated from larger lumps of coal during the mining and preparation process. While coal fines retain the same energy potential of coal they are generally considered a waste product as the particulate nature of the product renders it difficult to market and transport. As much as 70-90 million tonnes of coal fines are produced in the US alone as waste bi-product every year by the mining industry (Baruva, P., Losses in the coal supply chain, IEA Clean Coal Centre Rep.CCC/212, p. 26, December 2012, ISBN 978-92-9029-532-7), the vast majority of which is left unused. Coal fines are therefore generally discarded as spoil close to the colliery forming large waste heaps or contained in large ponds that require careful future management in order to avoid environmental contamination.

Nevertheless, coal fines could offer the potential for a cheap and plentiful supply of hydrocarbons particularly rich in carbon (M. Lewitt, Opportunities for fine coal utilisation, IEA Clean Coal Centre Rep. CCC/185, July 2011, ISBN 978-92-9029-505-1.). However, in its natural state, coal fines typically contain significant levels of ash-forming components and water that render it unsuitable for many conventional uses. The traditional view has been that the cost of dewatering and/or drying as well as de-ashing fines <150 µm in diameter generally exceeds the actual fuel value of the resultant product (Muzenda, E., Potential uses of South African Coal Fines: A Review, 3rd International Conference on Mechanical, Electronics and Mechatronics Engineering (ICMEME'2014) Mar. 19-20, 2014 Abu Dhabi (UAE), p. 37). It is known to add highly processed coal fines to fuel oils in order to reduce the cost per unit volume of the resultant blended fuel oil (see for example U.S. Pat. No. 9,777,235). In addition, highly processed coal fines can be added to crude oil in order to contribute to the fractionation products following distillation (see International Patent Application Published as WO2017/174973). In both instances the coal fines are blended with a liquid hydrocarbon to create a resultant admixture with enhanced perceived commercial value greater than that of the solid fines alone.

Commercial processes have been developed to convert coal waste fines (<500 microns) and ultrafines (<150 microns) into coal pellets, e.g. Coal Tech coal agglomeration technology in South Africa (http://www.coaltechenergy.com/). Another example (U.S. Pat. No. 5,242,470 A) claims coal particles in a mixture with a top particle size of about 28 mesh (700 microns) with at least about 50 percent of the particles being smaller than about 48 mesh (300 microns) with surface moisture content of 2-20% and 14-24% by weight. Note that total moisture is the sum of the surface moisture and inherent, pore-held internal moisture which itself can range from 1% m to 10% m for bituminous coals. These processes retain some water to aid the pelletising process, but do not upgrade coal waste in terms of ash content which is typically in the range 30-50% m, nor do they reduce the particle size.

Coal waste fines slurry has been to lower ash (i.e. <10% m) via froth flotation and have partially removed moisture to <20% m to form a coal powder using ultrafine particles (https://mineralsrefining.com/ and Luttrell, G. Yoon, R-H et al., Hydrophobic-hydrophilic separation (HHS) process for the recovery and dewatering of ultrafine coal, https://mineralsrefining.com/wp-content/uploads/2015/09/SME-2016-Gupta-et-al-HHS-Process-a.pdf). Others (US Patent Application 20160082446) operate at coarser particle sizes, i.e. <750 microns. A common feature in all these approaches is the utilisation of fines slurry as available in situ with only the coarsest particles removed. They lack a clear product quality target for utilisation, in terms of mineral matter content (assessed as ash content), particle size distribution and moisture content. Furthermore, such approaches have been driven mainly by the resource characteristics with little or no consideration being given to the importance of milling to the optimum coal particle size which will enable mineral matter to be released during froth flotation separation and achieve appropriate levels of ash content, particle size and moisture content for product utilisation in the power sector.

Coal rank and maceral composition (microscopically recognisable, individual organic constituents of coal) are key additional properties for coking coal utilisation assessment. Froth flotation techniques can lead to some concentration of the more valuable vitrinite maceral (U.S. Pat. No. 8,591,607 B2), but this is largely adventitious, small in magnitude, and not exploited in practice.

Now that international trading of coals is well established, the selection of coals for use in power generation no longer simply depends on the quality that can be produced at the nearest mines. Power generating companies recognise that coal quality significantly affects power plant variable costs, consequently Fuel Evaluation Tools have been developed to provide the basis behind the transfer price agreement with coal traders (Coal and Biomass Characterisation for a Power Generator, Uniper Technologies, Nottingham, UK, Coal Research Forum, Imperial College London, 20 Apr. 2016. http://www.coalresearchforum.org/CRF%202016ICL/ M20Quick,%20Uniper,%20ICL,%2020-04-16.pdf).

Blending of coals to optimise economic and technical considerations is now more common than the utilisation of coal from a single mine or coal processing plant (Tilman, D. A., Duong, D. N. B. and Harding, N. S, Solid Fuel Blending, Elsevier, 2012. ISBN 978-0-12-380932-2). Designing the optimum coal blend is influenced by the need to optimise environmental impact from emissions, efficiency, maintenance and availability, reagents and by-products and this is assessed from the range of coal quality parameters used in international trading coal specifications.

Coals are blended at the coal-mine, preparation plant, trans-shipment point or at the customer power station or coke oven. The blending method selected depends on site conditions, level of blending, quantity to be stored and blended, the accuracy required and the end use of the blended coal. Typically in power stations the stacking method with a fully mechanised system is followed (Sloss, L. L., Blending of coals to meet power station requirements, Report ref. CCC/238, IEA Clean Coal Centre, London, July 2014, ISBN 978-92-9029-559-4).

Coals are not just used in fuels. They represent a prime source of carbon for various metallurgical and chemical processes. The worldwide shortage of prime coking coals available for the chemical process of metallurgical coke manufacture drives the need to include more non-traditional components in coking coal blends. (Obayashi, Y., and Sheldrick, A., Japan steelmakers scramble for coking coal to make up Debbie losses, Reuters Business News, 21 Apr. 2017, http://ukseuters.com/article/uk-japan-steel-shortage/japan-steelmakers-scramble-for-coking-coal-to-make-up-debbie-losses-idUKKBN17N16J, and Bounds, A., Global demand for coking coal set to revive Cumbria mining, Financial Times, 19 Jun. 2017, https://www.ft.com/content/b054c570-528e-11e7-bfb8-997009366969). Hence, there is a demand for high quality reagents for use in steel and aluminium making that cannot be satisfied solely using traditional sources of metallurgical coke.

The present invention addresses the problems that exist in the prior art, not least in reducing the further accumulation of waste fines as a bi-product of the coal mining industry.

SUMMARY OF THE INVENTION

The present inventors have developed a process that provides for the utilisation of very high quality (low ash, sulphur and water content) purified coal products, that may be pelleted or briquetted, that have been upgraded from waste from coal tailings ponds, impoundments or tips and reject materials from current coal production processing (e.g. thickener underflow or tailings underflow waste streams), as well as high-ash content inferior seam coal, hitherto not exploitable economically.

The purified coal product shows utility in the following exemplary non-limiting applications:
  as a blend component for coal production processing, designed to upgrade mined coal quality to meet specification requirements for use;
  as chemical feedstock (coking coal for metallurgical coke manufacture or pulverised coal injection [PCI] into blast furnaces for steel production);
  for power generation;
  for thermal industrial or domestic utilisation;
  as a stand-alone product for any of these uses; and
  as a blend component, or stand-alone feed at a power plant, designed to improve operational efficiency, reduce sulphur oxide, particulate and trace element emissions, reduce carbon dioxide emissions per unit energy produced and reduce fuel cost.

Accordingly, in a first aspect the invention provides a process for upgrading of a coal product comprising the steps of:
  (i) providing a purified coal composition, wherein the composition is in the form of solid particles, and wherein at least about 90% by volume (% vol) of the solid particles are no greater than about 500 μm in diameter; and
  (ii) combining the purified coal composition with a solid coal feedstock, in order to create a combined solid-solid blend upgraded coal product.

In a specific embodiment, the purified coal composition is formed into pellets comprised of the solid particles. The purified coal composition is comprised within purified coal pellets that comprise in percent mass of the total product (% m) at most about 12% m ash, optionally less than 8% m ash, suitably less than 5% m ash.

According to one embodiment the purified coal pellets comprise at most about 25% m water, optionally less than 20% m of water, suitably less than 10% m of water, typically less than 2% m of water. Suitably, the PCPs comprise at most about 3% m of total sulphur and, optionally at most about 0.1% m chlorine, suitably at most about 0.05% m chlorine.

Typically, the purified coal composition is comprised within purified coal pellets that comprise total sulphur contents amounting to at most the native organic sulphur content plus no more than 0.5% m of additional mineral sulphur.

According to one embodiment, the solid coal feedstock is selected from one or more of the group consisting of: coking coal; pulverised coal injection coal (PCI); thermal coal and coal pulverised feed.

In a specific embodiment of the invention, the combined solid-solid blend comprises at most about any one of: 1% m, 5% m, 10% m, 20% m, 30% m, 40% m, 50%, and 60% m of the purified coal composition based on the total mass of the combined solid-solid blend, with the balance comprised of solid coal feedstock from single or multiple sources.

In a specific embodiment of the invention the combined solid-solid blend comprises at least about 0.01% m and at most about 60% m of the purified coal composition, with the balance comprised of solid coal feedstock from a single source based on the total mass of the combined solid-solid blend.

In yet a further embodiment of the invention the combined solid-solid blend comprises at least about 0.01% m and at most about 60% m of the purified coal composition, with the balance comprised of solid coal feedstock from multiple sources based on the total mass of the combined solid-solid blend.

In a second aspect the invention provides a process for upgrading of a coal product comprising the steps of:
  a) providing a first purified coal composition from a first source of coal fines, wherein the composition is in the form of solid particles that are compacted into pellets, and wherein at least about 90% by volume (% vol) of the solid particles are no greater than about 500 μm in diameter;
  b) providing a second purified coal composition from a second source of coal fines different from the first source, wherein the second composition is in the form of solid particles that are compacted into pellets, and wherein at least about 90% by volume (% vol) of the solid particles are no greater than about 500 μm in diameter; and
  c) combining the first and second compositions in order to create a combined solid-solid pelletized blended upgraded coal product.

According to further embodiments of the invention the combined solid-solid blend upgraded coal product of any of the aforementioned aspects and embodiments comprises one or more of:
  at least about 1% m, 2% m, 3% m and 4% m; and at most about 6% m, 7% m, 8% m and 10% m ash; and
  at least about 0.1% m, 0.2% m and; at most about 0.5% m, 1.5% m, 3% m, and 5% m of additional mineral sulphur above the native organic sulphur content; and
  at least about 2% m, 3% m or 4% m; and at most about 9% m, 10% m, 11% m, 12% or 13% m water;
  based on the total mass of the product.

In a specific embodiment of the invention the purified coal composition is subjected to a de-watering step prior to step (i) of combining the purified coal composition with the solid coal feedstock.

In a specific embodiment of the invention the purified coal composition is subjected to an ash removal step prior to step (i) of combining the purified coal composition with the solid coal feedstock.

A third aspect of the invention provides for a blended coal product comprising a purified coal composition in combination with a solid coal feedstock, wherein the purified coal composition is in the form of particles and is further characterised in that at least 95% by volume (% v) of the purified coal composition particles are no greater than about 500 μm in diameter, and wherein the blended coal product comprises at most about 99% m of purified coal composition, based on the total weight of the blended coal product. In a specific embodiment of the invention the blended coal product comprises a purified coal composition in which typically at least 95% v, optionally at least 98% v, and suitably at least 99% v of the particles are no greater than about 250 μm, optionally no greater than 100 μm, in diameter.

In embodiments of the invention a blended coal product is provided comprising a purified coal composition in combination with a solid coal feedstock, wherein the purified coal composition is in the form of particles and is further characterised in that at least 95% v, optionally at least 99% v, of the particles are no greater than about 250 μm, suitably 100 μm, typically 20 μm in diameter.

A fourth aspect the invention provides a process for preparation of a purified coal product, the process comprising the steps of:
  a. obtaining a starting material that comprises coal;
  b. subjecting the starting material to at least one fine grinding stage so as to reduce the starting material to a particulate composition in which substantially all of the particles are no more than 500 microns (μm) in diameter;
  c. exposing the particulate composition to at least one froth flotation stage so as to separate hydrocarbonaceous material comprised within the particulate composition from mineral matter, wherein during the at least one froth flotation stage the hydrocarbonaceous material is associated with froth produced and separated from the at least one froth flotation stage;
  d. washing the froth separated from the at least one froth flotation stage with water to release the hydrocarbonaceous material; and
  e. subjecting the hydrocarbonaceous material to at least one dewatering stage so as to obtain a particulate purified coal product that has an ash content of less than 12% m, a water content of less than 25% m and wherein the particles comprised within the particulate purified coal product have a d90 of less than 70 μm.

In a specific embodiment of the invention the starting material comprises a feedstock selected from one or more of the group consisting of: waste from coal tailings ponds, impoundments or tips; reject materials from coal production processing; and high-ash content inferior seam coal.

According to a further embodiment the fine grinding stage is conducted in a ball or bead mill. Typically the starting material is processed during find grinding stage to a particulate composition in which substantially all of the particles are no more than 250 μm. 150 μm, 100 μm, 90 μm and; suitably no more than 80 μm in diameter; optionally no more than 70 μm in diameter.

In a particular embodiment of the invention the froth flotation stage is conducted with solids to liquids loading of less than 20% m, suitably less than 15% m, typically less than 10% m and optionally less than 5% m or lower.

In yet a further embodiment the dewatering stage comprises subjecting the hydrocarbonaceous material to dewatering selected from one or more of the group consisting of: mechanical dewatering; cyclonic dewatering; centrifugal dewatering; and thermal dewatering. Optionally the dewatering stage may comprise subjecting the hydrocarbonaceous material to at least two different dewatering stages.

According to one embodiment of the invention the particulate purified coal product obtained by the process has an ash content of less than 12% m or 8% m, optionally less than 5% m, typically less than 2% m, suitably less than 1% m. In a further embodiment the particulate purified coal product obtained by the process has a water content of less than 25 m % or 20 m %, typically 15% m, suitably less than 12% m, optionally less than 10% m, typically less than 8% m. In embodiments the particles comprised within the particulate purified coal product have a d90 of less than 100 μm or 70 μm, typically 50 μm, suitably less than 40 μm, optionally less than 20 μm.

A fifth aspect of the invention provides a particulate purified coal product obtainable by a process as described herein, wherein the particulate purified coal product has an ash content of <2% m, typically <1% m, a water content of <7% m and wherein the particles comprised within the particulate purified coal product have a d90 of less than 70

μm, typically less than 50 μm. Typically, the particulate coal product of is formed into a briquette.

A sixth aspect of the invention provides for a pelletized coal product comprising a purified coal composition, wherein the purified coal composition is in the form of micronized particles, wherein the product comprises:

at most about 0.5% m, 1% m, 2% m, 3% m and 4% m of ash; and
at most about 0.1% m, 0.2% m, and 0.5% m of additional mineral sulphur above the native organic sulphur content;
at most about 5% m, 8% m, 12% m, 15% and 20% m water;
based on the total mass of the product; and further characterised in that at least 95% by volume (% v) of the purified coal composition particles are no greater than about 500 μm in diameter. In a specific embodiment of the invention the pelletized coal product comprises a purified coal composition in which typically at least 97% v, optionally at least 98% v, and suitably at least 99% v of the particles are no greater than about 250 μm, optionally no greater than 100 μm, in diameter. It will be appreciated that the invention may be subjected to further combinations of the features disclosed herein but which are not explicitly recited above.

DRAWINGS

The invention is further illustrated by reference to the accompanying drawings in which.

DETAILED DESCRIPTION OF THE INVENTION

Figure 1:
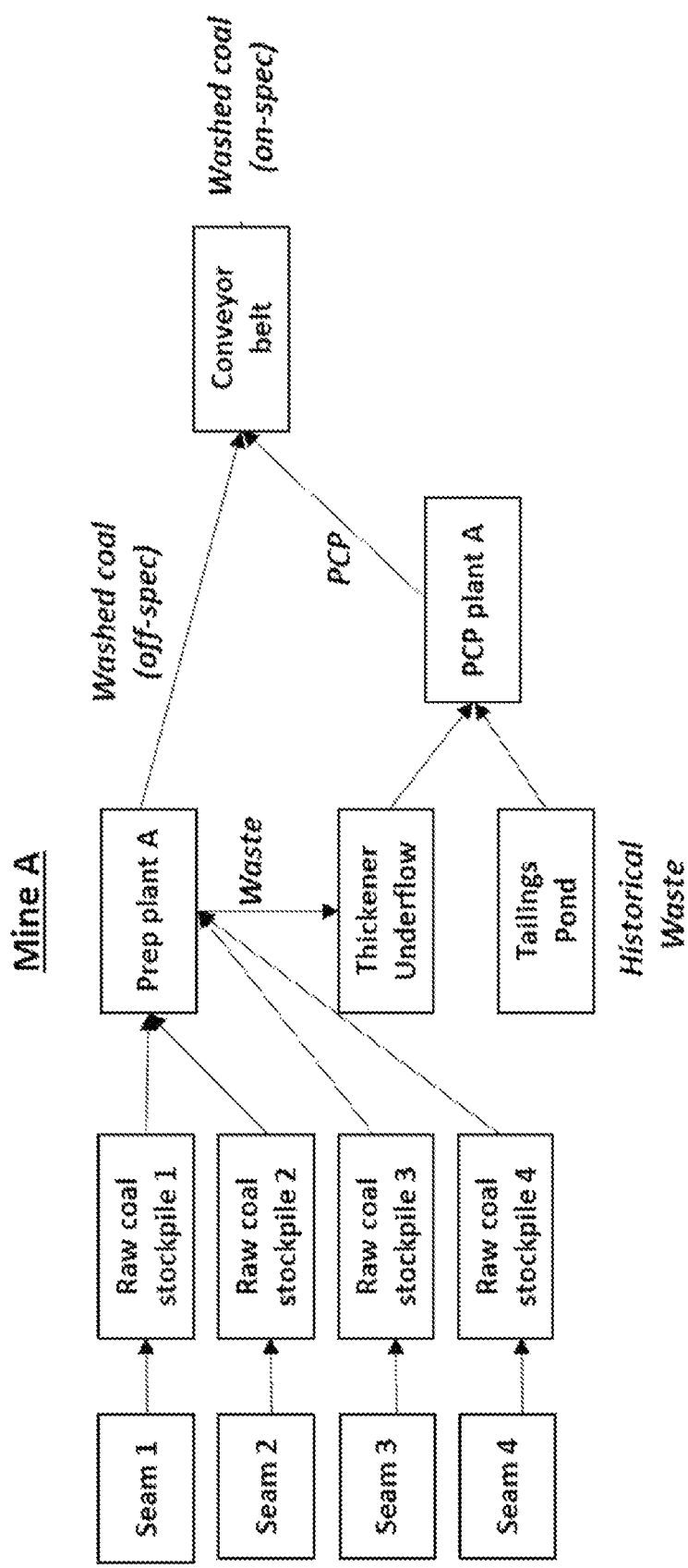
FIG. 1 shows schematic diagrams of typical blending operations utilising purified coal product pellets (called PCP pellets) at (a) coal-mine preparation plant A, (b) port B, and (c) power plant C and coke oven D.
Figure 1:
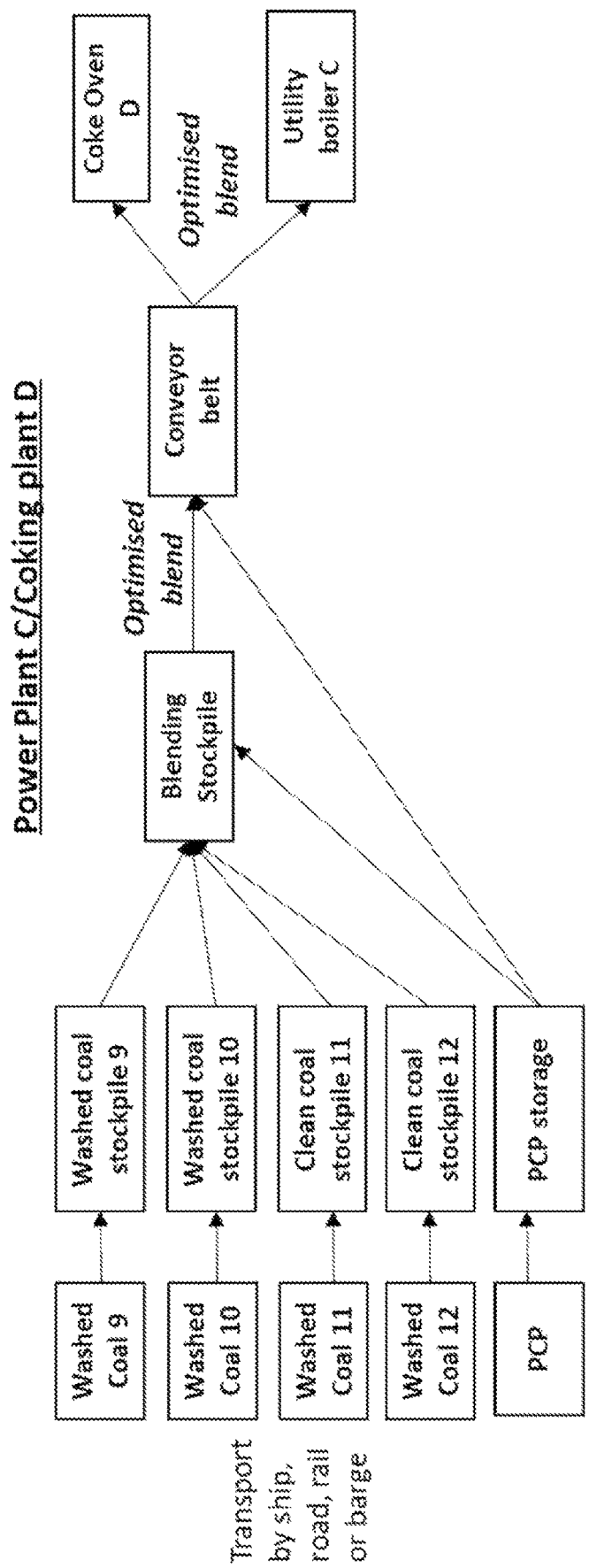

All references cited herein are incorporated by reference in their entirety. Unless otherwise defined, all technical and scientific terms used herein have the same meaning as commonly understood by one of ordinary skill in the art to which this invention belongs.

Prior to setting forth the invention in greater detail, a number of definitions are provided that will assist in the understanding of the invention.

As used herein, the term "comprising" means any of the recited elements are necessarily included and other elements may optionally be included as well. "Consisting essentially of" means any recited elements are necessarily included, elements that would materially affect the basic and novel characteristics of the listed elements are excluded, and other elements may optionally be included.

"Consisting of" means that all elements other than those listed are excluded. Embodiments defined by each of these terms are within the scope of this invention.

The term "coal" is used herein to denote readily combustible sedimentary mineral-derived solid hydrocarbonaceous material including, but not limited to, hard coal, such as anthracite; bituminous coal; sub-bituminous coal; and brown coal including lignite (as defined in ISO 11760:2005). "Native" or "feedstock" coal refers coal that has not been subjected to extensive processing and comprises a physical composition (e.g. maceral content) that is substantially unchanged from the point of extraction. In contrast, the terms "coal-derived product", "coal replacement product" and "purified coal compositions" are used herein to refer to various coals which have been subjected to one or more processes that lead to a change in physical and/or chemical compositions of the coal such that it is substantially changed from the point of extraction—i.e the natural state.

As used herein, the term "ash" refers to the inorganic—e.g. non-hydrocarbon—mineral component found within most types of fossil fuel, especially that found in coal. Ash is comprised within the solid residue that remains following combustion of coal, sometimes referred to as fly ash. As the source and type of coal is highly variable, so is the composition and chemistry of the ash. However, typical ash content includes several oxides, such as silicon dioxide, calcium oxide, iron (III) oxide and aluminium oxide. Depending on its source, coal may further include in trace amounts one or more substances that may be comprised within the subsequent ash, such as arsenic, beryllium, boron, cadmium, chromium, cobalt, lead, manganese, mercury, molybdenum, selenium, strontium, thallium, and vanadium.

As used herein the term "low ash coal" refer to native coal that has a proportion of ash-forming components that is lower when compared to other industry standard coals. Typically, a low ash native or feedstock coal will comprise less than around 12% m ash. The term "deashed coal", or the related term "demineralised coal", is used herein to refer to coal that has a reduced proportion of inorganic minerals compared to its natural native state. Ash content may be determined by proximate analysis of a coal composition as described in ASTM D3174-12 Standard Test Method for Ash in the Analysis Sample of Coal and Coke from Coal. In embodiments of the present invention ash content in purified coal product of less than 10% m, less than 8% m, less than 5% m and less than 2% m or even less than 1% m are obtained. Indeed, the present inventors have found quite unexpectedly that products having very low ash contents of around or below 1% m can be obtained from starting material that is as much as 50% m ash without having to sacrifice yield levels that render the process un-commercial.

Inferior coal is a term used in geological survey of the quality of coal seams (e.g.UK coal survey, 1937) and refers to intrinsic ash in coal bands or coal seams above 15.1% m and below 40.0% m. Coal bands or coal seams consisting of inferior coal contain mineral matter intimately mixed within the coal itself and consequently are very difficult to purify using conventional coal processing techniques.

As used herein, the term "coal fines" refers to coal in particulate form with a maximum particle size typically less than 1.0 mm. The term "coal ultrafines" or "ultrafine coal" or "ultrafines" refers to coal with a maximum particle size typically less than 0.5 mm (500 microns (μm), approximately 0.02 inches).

The term "coal microfines" or "microfine coal" or "microfines" refers to coal with a maximum particle size typically less than 20 μm.

Most suitably the particle size of the coal fines that is utilised as feedstock may be at most 1000 µm or 500 µm. More suitably, the maximum particle size may be at most 300 µm, 250 µm, 200 µm, 150 µm, or 100 µm.

A typical measure of particle size is to quote a maximum particle size and a percentage value or "d" value for the proportion by volume of particles within the sample that fall below that particle size. Suitably, the "d" value associated with any of the above maximum particle sizes may be d99, d98, d95, d90, d80, d70, d60, or d50.

Most suitably, the maximum particle size cut-off for purified coal product produced by the process of the invention may be at most 95 µm, 90 µm, 85 µm, 80 µm, 75 µm, 60 µm, 50 µm, 40 µm, 30 µm, 20 µm, 18 µm, 15 µm, 12 µm, 10 µm, or 5 µm. The minimum particle size may be 0.01 µm, 0.1 µm, 0.5 µm, 1 µm, 2 µm, 3 µm, or 5 µm. Any "d" value may be associated with any one of these particle sizes. To maximize the desirable physical and chemical properties of the purified coal product it is typical for the product particle size to be both relatively homogeneous and small. For instance, in a specific embodiment of the invention the purified coal product has a d90 of <100 µm, <90 µm, <70 µm, <50 µm optionally <20 µm. Suitably, the microfine purified coal product has a d99 of <70 µm, <60 µm, <50 µm, <40 µm, <20 µm, and optionally <10 µm.

As used herein, the term "water content" refers to the total amount of water within a sample, and is expressed as a concentration or as a mass percentage (% m). When the term refers to the water content in a coal sample it includes the inherent or residual water content of the coal, and any water or moisture that has been absorbed from the environment. As used herein the term "dewatered coal" refers to coal that has an absolute proportion of water that is lower than that of its natural state. The term "dewatered coal" may also be used to refer to coal that has a low naturally-occurring proportion of water. Water content may be determined by analysis of a native or purified coal composition as described in ASTM D3302/D3302M-17 Standard Test Method for Total Moisture in Coal.

The term "hydrocarbonaceous material" as used herein refers to a material containing hydrocarbons; hydrocarbons being an organic compound consisting substantially of the elements hydrogen and carbon. Hydrocarbonaceous material may comprise aliphatic as well as aromatic hydrocarbons.

As used herein, the terms "native organic sulphur content" of coal and other hydrocarbonaceous materials refers to the sulphur content present in the organic molecular structure, typically as thiol, thioether, thiophene and other aromatic sulphur heterocyclic species. In general, organic sulphur cannot be removed by physical processing methods, only by chemical processes, such as hydrogenation and hydrocracking. It is measured indirectly as the difference between total sulphur content and the mineral sulphur species that comprise pyrite, free sulphur and sulphate (ASTM D2492-02 (2012) Standard Test Method for Forms of Sulfur in Coal). The processes of the present invention may show utility in depleting mineral sulphur species from a hydrocarbonaceous starting material, such as a high or medium sulphur coal.

Coal mines, especially multi-seam surface mines and associated coal processing and preparation plants, are limited in output and market pricing by the availability of high grade quality seams necessary to meet high specifications for coking and pulverised coal injection (PCI) coals. These limitations are leading to lower and less efficient production of this important chemical feedstock from a rapidly diminishing worldwide resource base. Tighter product specifications for internationally traded thermal coals are also leading to lower, and less efficient, production in the coal industry. As a result of more demanding environmental standards, coal processing plants are increasingly also limited in their ability to store waste coal product in tailings ponds, impoundments or tips.

Thermal coals sold and traded internationally for power generation, are typically high ash content (at least 15-20% m dry basis), high sulphur content (1-2% m dry basis or more), moderately-high water content (10-15% m or higher) and with a relatively coarse particle size distribution (<50 mm). Coal power plant boilers utilise pulverised PCI fuel (i.e. dried coal particles, typically in the size range 20-120 microns) and consume significant amounts of energy in crushing, drying and pulverising thermal coals. The ash generated during combustion has to be removed either as slag ash or fly ash: in both cases ash reduces operational efficiency and incurs environmental as well as commercial costs for disposal. Power stations utilise flue gas desulphurisation techniques to minimise the emissions of sulphur oxides to the atmosphere; the cost of operating such desulphurisation techniques is proportional to the coal feedstock sulphur content.

Coal seams with high ash content are abundant worldwide, sometimes as thick seams persisting over a wide area, but a great many are not exploitable economically due to the problems described above.

In one embodiment, the present inventors utilise a purified coal product in methods and processes that blend the purified coal product with otherwise off-spec, low or intermediate grade coal feedstock, in order to produce a coal product that falls within the rigorous standards required for thermal and/or coking and PCI coals. Suitably, the purified coal product may be comprised within a pelletized coal product, such that blending with native feedstock coal involves combining a predetermined mass of pellets with a predetermined mass of native feedstock coal to produce a blended product. The relative proportions of the starting materials (e.g. pellets and feedstock) can be decided based upon the desired final chemical and physical properties of the blended product. By way of non-limiting example, a low-grade feedstock-coal may be upgraded to a desired specification by determining how much of the pelletized purified coal product needs to be added, in order to achieve required ash, water, sulphur and/or chlorine content. In this way the purified coal product can serve as an additive (when as a minor fraction) or as a blend component (when present as a major fraction) of the final coal product.

Purified coal pellets derived from coal waste sources, such as thickener underflow, impoundments, tailings ponds or tips, and from inferior coal seams otherwise not economically extractable, can now be manufactured to such high quality (very low ash, moisture, sulphur and phosphorus contents with Gross Calorific Value in excess of 5500 kcal/kg, as received basis and in some cases, coking properties as well) such that they can be blended to:
a. achieve specification limits used for internationally sales of:
  i. metallurgical coking coals of high value and scarcity;
  ii. pulverised coal injection (PCI) coals of intermediate value; and
  iii. thermal coals.
b. enable coal processing plants to increase total production, improve production efficiency and extend the lifetime of the mine by utilising the beneficial properties of PCP to include lower quality coal seams or other coals;

c. enable coal processing plants to minimise price penalties by utilising the beneficial properties of PCP to offset shortfalls in specifications from normal coal production.

The purified coal pellets may be prepared by several process stages:

milling, to reduce particle size sufficiently to enable efficient separation;

froth flotation in aqueous media to separate coal from mineral matter;

filtration under pressure and air-blowing to remove water by mechanical means;

compaction into pellets to provide mechanical integrity; and drying thermally to reduce water to below 5% m Blending purified coal pellets into coking coal, PCI coal and thermal coal production processing streams improve the final product quality for some, or all, of the following parameters needed to achieve market specifications, minimise penalties from shortfalls in such specifications, and enable coal processing plants to include lower quality streams, thus increasing production or extending mine lifetime.

Typically to achieve the aims of bringing blended coal products up to the required specifications it is necessary to ensure the product meets a number of established parameters. Reduction of content of ash, and/or moisture, and/or phosphorus, and/or sulphur, and/or carbon, and/or sodium oxide in the ash is a key requirement, in order to reduce waste and improve energy efficiency. It is also desirable to increase indices of calorific value, and/or swelling, and/or dilatation, and/or fluidity in the final blended product. Finally, the blended products should achieve targets for volatile matter content, and/or petrographic composition, and/or grindability, and/or coke strength reactivity.

According to specific embodiments of the invention, the processes and methods of the invention may take place at any of the following locations in the supply chain:

at the mine
  by selective stacking and recovery of different quality products from stockpiles
  by blending on belts or into the train load out bin with product stockpiles of different specifications;
at a port stockyard by blending truck or train loads on receipt into stockpiles designated for ship arrivals;
during ship loading by blending varying quantities from different stockpiles; and
at a customer stockyard by blending from different stockpiles fed by truck, train or ship.

In one embodiment of the invention blending purified coal pellets into coal pulveriser feed contributes to combustion plant efficiency improvements and cost reductions during a steam raising process for power or heat generation.

Key benefits that become apparent as a result of the products and processes of the present invention, are set out in more detail below.

Reduced Delivery Costs:

Reducing the ash and moisture content of a typical hard coal results in PCP with approximately 25% higher energy density than an equivalent traded coal. This translates directly into a 25% saving in delivery costs through the supply chain. Coal handleability describes the ability of the bulk coal to flow through chutes and bunkers or transfer between conveyors and so on. The two most important parameters affecting flow characteristics are free moisture and fines content; in both cases high values, especially in combination, can lead to coal that is very difficult to handle. In severe cases, coal can become stuck in rail wagons or coal bunkers and considerable time and effort is required to clear blockages. The PCP is effectively 100% coal fines, and it is only by forming pellets that the coal can be efficiently handled. The handleability of purified coal pellets is likely to be different to that of coal. In fact, uniform sized coal pellets would normally be expected to exhibit superior flow characteristics to that of native feedstock coal.

Reduced Grinding Energy During Grinding Feed Coal to Pulverised Fuel (PF) Particle Sizes:

The ease with which a coal can be milled is commonly measured as the Hardgrove Grindability Index (HGI). Traded coals typically have HGI in the range 45-65, with low numbers indicating a coal that is difficult grind. Testing on PCP has shown HGI values of 67 and 74, which are equivalent to an easy-to-grind coal. In fact, because the pre-pelletized coal particle size distribution is similar to that required after milling traded coal, it is evident that relatively little energy is required to produce pulverised coal from PCP, or blends comprising PCP, in a power plant.

Less Preheating of Inlet Air to the Grinding Mill:

To dry coal before it is delivered to the boiler the primary combustion air is typically pre-heated. At this point 70% of the moisture in the coal is evaporated, resulting in pulverised fuel (PF) with ~3% moisture content. This is dry enough for PF to flow freely through pipelines to the boiler. Mill inlet air temperatures vary from 150-400° C., depending on mill design and coal moisture. However, PCP already has very low moisture content, so there is no need to dry the fuel further, consequently the air inlet temperature to the mill can be reduced accordingly. Mill inlet temperatures between 140-180° C. are required for South African, Australian and Indian coals to dry the coal sufficiently, whereas PCP, and blends that comprise significant proportions of PCP, requires far lower mill inlet temperatures. For a 100% PCP composition a reduced inlet temperature of only 79° C. is required.

Improved Combustion Efficiency:

Coal combustion has two stages: devolatilisation occurs rapidly (<0.1 seconds) while the resulting char takes many seconds to burn out, as it travels through the boiler. Combustion efficiency describes how much of the heat content of the coal is combusted within the boiler. For a traded coal there is an efficiency loss from about 1% unburned carbon efficiency loss. Faster burn out is obtained by using smaller coal particles. The PF size distribution when firing PCP is considerably better than seen when firing standard coals. In particular embodiments, it is likely that the percentage of particles above 150 μm in diameter will be less than 5% and therefore very high combustion efficiencies are possible when firing PCP and PCP-containing blends.

Greater Boiler Efficiency:

The largest boiler efficiency loss in a power plant is the heat lost in the flue gases, which typically exit the air-heaters at around 130° C. The heat lost in moisture in the flue gases will be lower for PCP, since there is only approximately 2% moisture in the pellet. Also heat lost within the ash is lower for PCP than for standard native coal, although this is a relatively smaller effect.

Reduced Slagging and Fouling:

The deposition of fused ash deposits is known as slagging and causes loss of boiler availability; it is associated with coals containing high levels of iron or calcium. High sulphur US coals are known to be especially prone to slagging because they also contain high levels of iron. PCP has a very low slagging risk because it contains very low levels of iron, calcium and sodium in the ash. Ash deposition in the back-end zones of the boiler or air-heater is known as fouling. US high sulphur coal also shows higher risks for air-heater fouling than PCP.

Reduced Corrosion:

The corrosion of water boiler walls is related to elevated levels of chlorine in coal, especially when combined with high levels of alkali metals. Sulphur in coal also increases the risk of corrosion, but to a lesser extent than chlorine. US high sulphur coals pose the highest risk for boiler corrosion, due to their high sulphur and chlorine content. Corrosion risks are greatly reduced for PCP, and PCP containing blends, because the production process is removes a high proportion of the chlorine content and the levels of alkali metals are also slightly reduced.

Reduced Risk of Premature Boiler Tube Failure from Erosion:

Such erosion is caused by the flow of abrasive ash past the tubes. This risk is dependent on the quantity and abrasiveness of the coal ash and flue gas velocities. It is an especially significant problem in Indian power plants because Indian coals contain very high levels of abrasive ash, and Indian power plants firing indigenous coals typically have to be specially adapted to manage erosion risks. Such erosion risks are reduced significantly by the lower coal ash level of PCP, and PCP containing blends, leading to a significant increase in plant availability.

Lower Amounts of Furnace Bottom Ash and Pulverised Fuel Ash:

Reducing the ash content of coal obviously results in lower amounts of furnace bottom ash and pulverised fuel ash produced as by-products. PCP and PCP containing blends inherently produce less ash. This is beneficial to those power plants with insufficient local market to sell the ash, for cement manufacture usually, who otherwise would incur commercial cost and cause environmental problems disposing of the waste ash.

Lower Carbon Content in Ash Sold for Use in Cement:

As mentioned, wherever possible power plants aim to sell ash to external companies to avoid incurring costs for disposal. The most common use of coal ash is as a cement replacement material in the manufacture of concrete. In Europe the standard EN450 stipulates quality requirements that must be achieved to qualify for this market; the most critical of these is carbon-in-ash levels should be <5% to meet a 'Grade A' standard. Carbon-in-ash is a function of combustion efficiency and coal ash content. The improved combustion efficiency observed for PCP, and PCP containing blends, means that low carbon-in-ash levels are achievable. Such that what little ash is produced is also of greater economic value.

Reduced Flue Gas Desulphurisation Costs:

Sulphur oxides emission limits at most coal-fired power plants are lower than levels produced during combustion, so Flue Gas Desulphurisation (FGD) technology is commonly installed. The most common variant of this is limestone-gypsum FGD, whereby flue gases are mixed with a limestone ($CaCO_3$) slurry and gypsum ($CaSO_4.2H_2O$) is produced as a by-product. PCP has low sulphur content and reducing coal sulphur content has a linear impact on $SO_2$ emissions, so less limestone is required for the FGD process, which reduces expenditure on reagents. In addition, FGD consumes considerable amounts of power and has substantial maintenance demands, both of which will be reduced when operating with PCP.

Lower Emissions of Carbon Dioxide:

$CO_2$ emissions are directly related to the quantity of carbon burned, and a 1% increase in absolute unit efficiency will lead to a 2.5% reduction in $CO_2$ emissions (for a 40% efficient coal power plant). PCP and PCP containing blends provide significant reductions in $CO_2$ emissions, due to lower fuel moisture content and higher unit operating efficiency. For the German hard coal power plant modelled in the Examples below and shown in FIG. 1, $CO_2$ emissions are predicted to be 5% lower for PCP than for the US high sulphur coal. Of this 5% reduction, approximately 3.5% is from the lower $CO_2$ emission intensity of PCP as a fuel and 1.5% is due to the higher plant efficiency.

Reductions in Auxiliary Power Consumption:

Auxiliary power is electricity used within the power plant for the operation of mills, fans and pumps etc. Typically, around 5-8% of electricity produced at a power plant is consumed as auxiliary power and is therefore not available for export to the power grid. PCP can deliver significant reductions in auxiliary power consumption as a direct result of all of the ancillary benefits so far described. In particular, the pre-milled state of PCP and blends containing PCP results in lower processing power and handling demands for the fuel and waste ash.

In one embodiment the invention provides for a blended coal product that is derived, in part, from low grade coal but that is suitable for use in coking, pulverised coal injection (PCI) and thermal coal products for inland and international trade. The blended coal product is an upgraded coal product that permits use of otherwise uneconomical grades of coal for uses that would otherwise be restricted only to high grades. Such uses include as feed for metallurgical coke plants, blast furnaces, coal-fired power stations and industrial coal-fired heating plants.

A coal stockpile at a terminal, port or mine has three main functions:
- Buffering by providing sufficient reserve of blended raw materials to guarantee the continuous operation of the truck loading, ship loading and processing plant.
- Integration of several raw coal feeds with different chemical and/or physical characteristics in such weight proportions that a completed pile represents the requisite composition.
- Homogenising by spreading out each feed in many layers over the full length of the pile, thus differences in chemical or physical material properties in cross-sections of the pile compared with the average of the property in the input of the pile are minimised.

Three examples of typical blending operations are described schematically in FIGS. 1(a), (b) and (c).

a. At a coal mine preparation plant, where stockpiles of raw coal from several seams (four in this case) are blended at a preparation plant close to mine A. PCP plant A constructed nearby would process current waste (thickener underflow) from mine A coal preparation plant and historical waste from the tailings pond (s) into PCP. The PCP would be fed on to a moving conveyor belt from a track hopper or wagon to merge with a washed coal stream from the coal preparation plant (which may not meet the full trading specifications required); the resultant blended washed coal would meet the trading specifications.

b. At a port stockyard, where stockpiles of washed coal are received by road, rail or barge from several coal preparation plants (four in this case at port B) and mixed in a blending stockpile. PCP is also transported from a PCP plant to the port typically by road, rail or barge and stored, preferably in a covered hopper, silo or storage vessel to minimise moisture uptake from rain water. PCP may be mixed on to a blending stockpile using conventional stackers which stack individual washed coals in layers, and reclaimers before being loaded on to a ship for export. Alternatively, conventional conveyor blending on a moving belt where PCP is fed on to the belt from a track hopper or wagon to merge with the blend of washed coals from the stockpile. In this way a blend from washed coals 5, 6, 7 and 8 could be upgraded to meet international trading specifications. Stackers pile bulk material such as coal or PCP on to a stockpile, whereas a reclaimer can be used to recover the material. They normally travel on a rail between stockpiles in the stockyard.

c. At a power plant or coking plant, where stockpiles of washed coal are received by road, rail or barge from several consignments from ships, by rail, road or barge (four consignments in this case at power plant C or coke oven D) and mixed in a blending stockpile. PCP is also transported to the plant by road, rail, ship or barge and stored, preferably in a covered hopper or storage vessel to minimise moisture uptake from rain water. PCP may either be mixed with a blending stockpile using conventional stackers and reclaimers or via conveyor belt blending before being either dried and pulverised prior to combustion in utility boiler C or loaded as a charge in coke oven D. In this way a blend from washed coals 9, 10, 11 and 12 could be upgraded to meet an optimised blend either to improve the operational efficiency of the utility boiler C or the quality of the metallurgical coke produced at coke oven D.

Suitable blending equipment to mix purified coal pellets with other feeds within coal preparation plants, and within both coal-fired power plants and industrial boilers, include stackers, reclaimers, feeders and conveyors. Suitable manufacturers include ThyssenKrupp Robins, Inc., 6400 South Fiddler's Green Circle, Suite 700, Greewood Village, Colo. 80111-4985, USA, Bedeschi Mid-West Conveyor, 8245 Nieman Road, Lenexa, Kans. 66214, USA., Feeco Int., 3913 Algoma Road, Green Bay, Wis. 54311-9707 USA, Nepean, 23 Graham Hill Road, Narellan, NSW 2567 Australia, and FLSmidth, Vigerslev Allé 77, 2500 Valby, Denmark.

In a further embodiment of the invention, a blended product is provided which comprises a first PCP derived from a first native coal source in combination with at least a second PCP derived from a second native coal source different from the first native coal source. Optionally, at least the first native coal source comprises a low-grade coal. Suitably the second native coal source comprises a coal of higher grade compared to the first native coal source. In an alternative embodiment, both the first and second native coal sources are low grade coal sources. Typically, the first and/or second native coal sources comprise waste coal fines, such as those present in pond tailings or processing plant thickener underflow.

The invention further provides for the use of a PCP as an additive for reducing one or more of the group consisting of: ash content; carbon-in-ash content; sulphur content; and chlorine content in a coal feedstock.

The present invention further provides for the use of a PCP as an additive for increasing the combustion efficiency in a coal feedstock.

Figure 4:
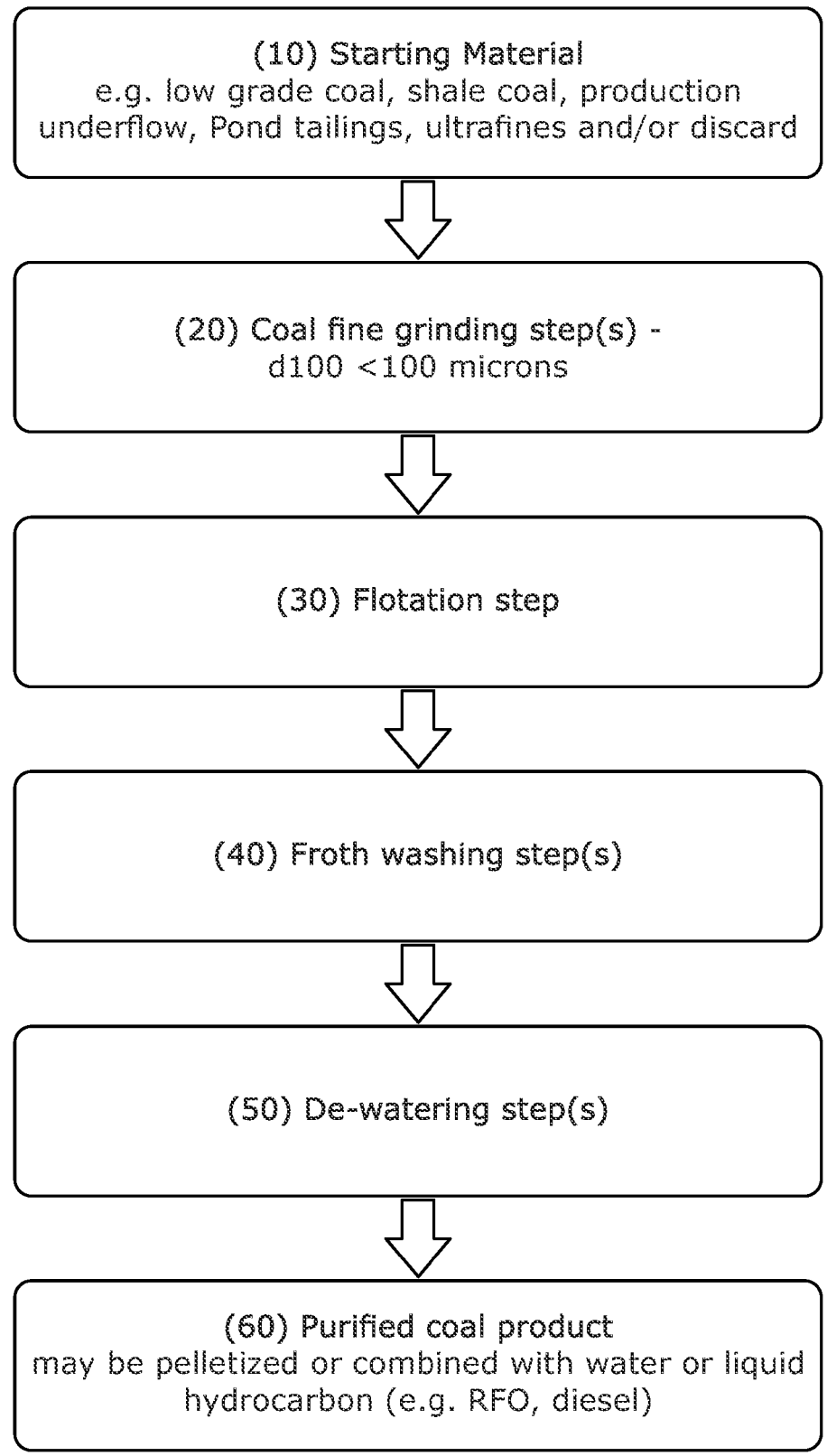
FIG. 4 shows a flow diagram of a process of one embodiment of the present invention.

In embodiments of the invention the process for preparation of a micronized PCP is provided. As set out in FIG. 4, a process is provided in which a feedstock starting material (10) is subjected to one or more fine milling stages (20). The starting material (10) is typically selected from residual coal discard such as low-grade material, waste material, production underflow and such like. Whilst the starting material (10) comprises hydrocarbonaceous material that is of potentially high value, it may comprise considerable amounts of ash, sulphur and water rendering it of limited use for conventional purposes. The one or more fine milling stages (20) convert the highly heterogeneous starting material (10) into a finely ground product typically having a d100 of at most around 100 µm. The finely ground product is subjected to at least one froth flotation step (30) which is used to sort hydrophobic hydrocarbonaceous material within the coal from the hydrophilic mineral materials that constitute the ash. Following separation of the ash from the hydrocarbonaceous materials, the purified microfine coal material comprised within the froth is washed extensively (40) with water. The resultant purified coal product material is dewatered (50) using one or more processes that may include mechanical, thermal and/or rotational drying techniques (50). Reduction of water content to below 10% m is preferred, optionally less than 5% m can be obtained, and typically water content of below 2% m is achieved according to embodiments of the invention. The micronized purified coal product (60) may be maintained in powdered state or may be subjected to additional processing whereby it is combined with binding agents that facilitate pelletization or briquette formation. Alternatively, the purified coal product (60) may be combined with a liquid hydrocarbon, such as a refined or unrefined oil (e.g. residual fuel oil, diesel or crude oil), in order to form a slurry that may be stored or pumped to other locations.

Figure 5:
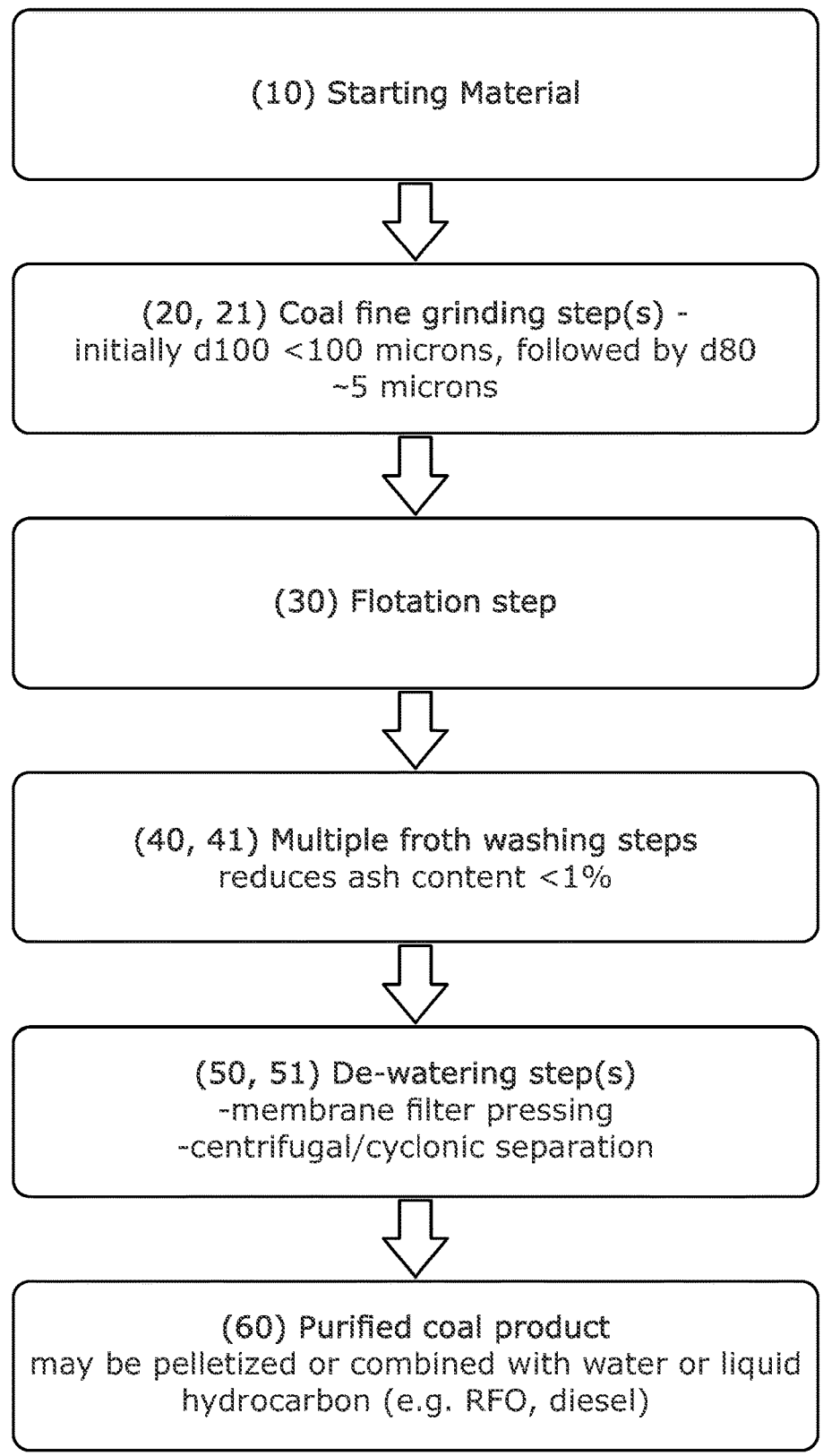
FIG. 5 shows a flow diagram of a process of a further embodiment of the present invention.

A process according to embodiments of the invention is set out in FIG. 5 that provides for multiple coal fine grinding steps (20, 21) as well as multiple froth washing (40, 41) and de watering (50, 51) steps in order to produce purified coal product meeting a desired specification. In the embodiment shown in FIG. 5, coal milling stages (20, 21) include a first pass grind to obtain a product having d100 of at most around 100 µm, followed by a second grinding stage to obtain a finer product having a d80 of around 5 µm which is then passed to the flotation step (30). Multiple volumes of water are utilised in order to wash the froth extensively (40,41) prior to de-watering steps (50, 51). A combination of membrane filter pressing together with centrifugal or cyclonic drying, as well as thermal treatment enables suitable dewatering to occur in order to meet the required low water content thresholds that are characteristic of micronized purified coal products of embodiments of the invention (60).

The invention is further illustrated by reference to the following non-limiting examples.

EXAMPLES

Demineralising and dewatering of coal fines may be achieved via a combination of froth flotation separation, specifically designed for ultrafines and microfine particles, plus mechanical and thermal dewatering techniques.

In all of the examples, the purified coal pellets used as a coal replacement product are prepared by several process stages:

A representative sample of coal waste slurry, e.g. Queensland medium-volatile bituminous coal A, derived from an impoundment, tailings pond or production tailings underflow is taken.

Particle Size Reduction

The sampled material is then reduced to a particle size of d80=30-50 microns (or finer in some coals) to achieve efficient separation to a target ash content of 5-8%. To achieve this, the feed is diluted with water to achieve a solids content of in the range 20-40%, then ground in a ball or bead mill depending on the top size of the feed. The product is screened at a size range of approximately 100 microns. In some circumstances a dispersant additive (e.g. lignin-based dispersants, such as Borresperse, Ultrazine and Vanisperse manufactured by Borregaard, 1701 Sarpsborg, Norway) is included to optimise energy use. Suitable equipment is manufactured by Metso Corporation, Fabianinkatu 9 A, PO Box 1220, FI-00130 Helsinki, FIN-00101, Finland, Glencore Technology Pty. Ltd., Level 10, 160 Ann St, Brisbane QLD 4000, Australia, and FLSmidth, Vigerslev Allé 77, 2500 Valby, Denmark.

Ash Removal

Typically, one stage of flotation (one rougher and several cleaner steps) is carried out to bring the ash content down to the target level. For some coals where the mineral matter is disseminated mainly within sub-10-micron size domains, more than one stage of flotation following further milling may be required.

Purified coal has been manufactured from a range of coal waste feeds from impoundments, tailings ponds and production underflow destined for impoundments and tailings ponds. These include coals from USA, Australia, South Africa and India of Carboniferous, Permian and Cretaceous geological ages and coal rank ranging from low-volatile bituminous to sub-bituminous, see Table 1. Using feeds with ash contents ranging from 24% m to 70% m, milling to approximately 30 μm particle size (d80) followed by cleaning stages leads to products with significantly lower ash contents, some as low as 5-10% m, but most from 10-30% m ash. A second milling to approximately 10 μm particle size (d80) followed by cleaning stages leads to products with ash contents in the range 0.6% m to 10.2% m, many of which have low enough ash contents to be used as a low ash blending feed, Finally, a third milling to approximately 5 μm particle size (d80) followed by cleaning stages leads to purified products with ash contents in the exceptionally low range of 0.7% m to 3.1% m, In some instances, processed coal with ash contents ranging from 4.2% m to 10.2% m has also been purified in the same way. The resultant ash contents of products at stage one were 1.2% m to 6.2% m, at stage two 0.6% m to 3.7% m, and at stage three 0.2% m to 2.8% m.

Table 1 shows the properties of froth flotation feeds and cleaned products from stage 1, stage 2 and stage 3 for a range of coals of different rank, geographical origin, geological age and source type. Sub-bituminous coals such as row 12 and row 17 examples are less hydrophobic than bituminous coals, which reduces the effectiveness of separation of hydrophilic and hydrophobic components by froth flotation. Recovery and separation in froth flotation is typically very poor for low rank coals, so it was surprising that we were successful in obtaining modest, yet significant yields (32-47% m) of product with an ash content as low as 2.3% m from a sub-bituminous coal.

TABLE 1

Properties of froth flotation feeds and cleaned products from stage 1, stage 2 and stage 3 for a range of coals of different rank, geographical origin, geological age and source type.

| | | | | Froth Flotation Feed | | | | | | | Stage 1 | | |
|---|---|---|---|---|---|---|---|---|---|---|---|---|---|
| | | | | | Vitrinite | | Ash | Sulphur content | | | | Ash | |
| Source type | ASTM class | Location | Geological age | Volatile Matter % daf | reflectance %* | Vitrinite content % v | content % m d.b. | Total (St) | Organic (So) % m d.b. | St-So | Particle Size μm | content % m d.b. | Coal Yield % m |
| Impoundment | hvb | PA, USA | Carboniferous | 35.2 | 0.89 | 84 | 44 | not determined | | | 38.0 | 7.1 | 89 |
| Impoundment | hvb | KY, USA | Carboniferous | 33.0 | 0.74 | 69 | 45 | 1.31 | 0.40 | 0.91 | 31.7 | 10.6 | 90 |
| Tailings ponds | lvb | QLD, Australia | Permian | 21.9 | 1.10 | 67 | 62 | 1.04 | 0.13 | 0.91 | 34.5 | 30.7 | 82 |
| Tailings ponds | hvb | NSW, Austrlalia | Permian | 37.8 | 0.64 | 96 | 45 | 0.32 | 0.09 | 0.23 | 26.8 | 13.6 | 66 |
| Tailings ponds | hvc | NSW, Australia | Permian | 35.8 | 0.58 | 73 | 59 | not determined | | | 31.5 | 17.3 | 79 |
| Tailings ponds | hvb | South Africa | Permian | 32.4 | 0.82 | 50 | 24 | 0.66 | 0.27 | 0.39 | 35.7 | 9.8 | 86 |
| Underflow | hvb | WV, USA | Carboniferous | 42.2 | 0.75 | not available | 70 | 4.09 | n.d. | | 25.7 | 17.9 | 72 |
| Underflow | hva | WV, USA | Carboniferous | 33.0 | 1.03 | 60 | | 2.73 | 0.39 | 2.34 | 23.9 | 11.0 | 85 |
| Underflow | hvb | WV, USA | Carboniferous | 35.9 | 0.99 | | 52 | 1.47 | 0.32 | 1.15 | 24.4 | 14.8 | 85 |
| Underflow | hvb | WV, USA | Carboniferous | 33.0 | 0.89 | 62 | 61 | 0.41 | 0.11 | 0.30 | 23.0 | 21.4 | 66 |
| Underflow | sub | CO, USA | Cretaceous | 42.0 | 0.68 | 81 | 39 | 0.49 | n.d. | | 35.0 | 14.3 | 52 |
| Underflow | hvb | WV, USA | Carboniferous | 38.6 | 0.74 | 82 | 48 | 3.00 | 2.06 | 0.94 | 33.0 | 6.5 | 86 |
| Underflow | hva | WV, USA | Carboniferous | 42.6 | 0.78 | 80 | 45 | 3.30 | n.d. | | 29.7 | 8.0 | 89 |
| Underflow | hva | KY, USA | Carboniferous | 35.9 | 0.91 | 82 | 52 | 0.82 | 0.49 | 0.33 | 32.2 | 4.6 | 88 |
| Processed | hva | KY, USA | Carboniferous | 41.3 | 0.90 | 69 | 4.2 | 0.99 | 0.87 | 0.12 | 34.7 | 1.2 | 94 |
| Processed | sub | AZ, USA | Cretaceous | 47.5 | not determined | | 9.2 | 0.52 | 0.42 | 0.10 | 30.2 | 4.4 | 72 |
| Processed | hva | AL, USA | Carboniferous | 30.6 | 1.10 | 78 | 10.4 | 0.60 | 0.46 | 0.14 | 28.6 | 6.2 | 99 |

TABLE 1-continued

Properties of froth flotation feeds and cleaned products from stage 1, stage 2 and stage 3 for a range of coals of different rank, geographical origin, geological age and source type.

| | Stage 2 | | | Stage 3 | | | | | |
|---|---|---|---|---|---|---|---|---|---|
| | Particle | Ash | Coal | Particle | Ash | Coal | Sulphur content | | |
| Source type | Size μm μm | content % m d.b. % m d.b. | Yield % m % m | Size μm μm | content % m d.b. % m d.b. | Yield % m % m | Total (St) | Organic (So) % m d.b. | St-So |
| Impoundment | 8.6 | 3.0 | 88 | 4.5 | 1.4 | 88 | 0.81 | 0.73 | 0.08 |
| Impoundment | 10.5 | 3.0 | 88 | 5.0 | 1.2 | 87 | 0.74 | 0.68 | 0.06 |
| Tailings ponds | 10.0 | 10.2 | 76 | 4.6 | 2.3 | 75 | 0.54 | 0.38 | 0.16 |
| Tailings ponds | 9.8 | 3.1 | 63 | 4.8 | 0.6 | 58 | 0.48 | 0.45 | 0.03 |
| Tailings ponds | 10.4 | 6.7 | 75 | 5.8 | 1.6 | 67 | not determined | | |
| Tailings ponds | 10.9 | 2.9 | 83 | 5.1 | 1.0 | 80 | 0.43 | 0.37 | 0.06 |
| Underflow | 9.7 | 6.7 | 68 | 5.3 | 2.1 | 67 | 2.34 | 1.9 | 0.44 |
| Underflow | 8.6 | 7.1 | 83 | 4.5 | 2.4 | 82 | 1.04 | 0.74 | 0.30 |
| Underflow | 9.1 | 6.4 | 83 | 4.8 | 3.1 | 81 | 0.99 | 0.76 | 0.23 |
| Underflow | 9.8 | 6.0 | 63 | 4.8 | 1.7 | 59 | 0.79 | 0.73 | 0.06 |
| Underflow | 10.2 | 7.3 | 45 | 4.8 | 2.3 | 32 | 0.61 | 0.54 | 0.07 |
| Underflow | 10.7 | 3.0 | 81 | 5.1 | 0.8 | 72 | 1.51 | 1.47 | 0.04 |
| Underflow | 7.9 | 2.3 | 87 | 4.7 | 1.3 | 85 | 2.14 | 1.92 | 0.22 |
| Underflow | 8.6 | 1.7 | 83 | 5.0 | 0.7 | 73 | 0.83 | 0.78 | 0.05 |
| Processed | 9.5 | 0.6 | 92 | 5.1 | 0.2 | 84 | 0.87 | 0.78 | 0.09 |
| Processed | 10.1 | 3.0 | 65 | 5.0 | 2.3 | 47 | 0.68 | 0.58 | 0.10 |
| Processed | 8.5 | 3.7 | 99 | 4.8 | 2.8 | 98 | 0.57 | 0.51 | 0.06 | lvb: low voaltile bituminous coal,
hva: high volatile a bituminous,
hvb: high volatile b bituminous,
sub: sub-bituminous
*As vitrinite mean random reflectance, unless shown in parentheses when it is given as vitrinite mean maximum reflectance
n.d. not determined The coal slurry is diluted further with water typically to a range of 5-20% m solids then collected in a tank and froth flotation agents, known as frother (e.g. methyl iso-butyl carbinol and pine oil) and collector (e.g. diesel fuel or other hydrocarbon oil, and Nasmin AP7 from Nasaco International Co., Petite Rue 3, 1304 Cossonay, Switzerland), are added using controlled dose rates. Micro particle separators (e.g. Flotation test machines manufactured by FLSmidth, Vigerslev Alle 77, 2500 Valby, Denmark, by Metso Corporation, Fabianinkatu 9 A, PO Box 1220, FI-00130 Helsinki, Finland, and GTEK Mineral Technologies Co. Ltd.) filled with process water and filtered air from an enclosed air compressor are used to sort hydrophobic carbon materials from hydrophilic mineral materials. Froth containing hydrocarbonaceous particles overflows the tank and this froth is collected in an open, top gutter. The mineral pulp is retained in the separation tank until discharged, whereas the demineralised coal slurry is de-aerated, before being pumped to the pelletisation step.

Sulphur Removal

Table 1 also illustrates the impact of the process on sulphur removal for the range of samples tested. Sulphur is found in coal as the mineral pyrite, as mineral sulphates and as organically-bound sulphur (e.g. native organic sulphur). Results are given for the total sulphur (St) and organic sulphur (So) of the feed and the thirds stage product. In addition, the difference between total sulphur and organic sulphur contents (St-So), i.e. the mineral sulphur component, has been computed. The process removes only mineral sulphur, and not organic sulphur. It is remarkable how low the mineral sulphur component is in the third stage products, mostly within the 0.03-0.10% m range, though higher values are also obtained up to 0.44% m. The higher values of (St-So) represent samples with significant amounts of sub-micron mineral domains. In contrast the feed mineral sulphur content (St-So) values for the underflow, impoundment and tailings pond feeds are much higher than that for most products, often greater than 0.9% m.

Dewatering

The concentrate from froth flotation is then dewatered with a filter-press or tube-press to a target range of 20-50% m depending on the actual particle size, under pressure or vacuum, sometimes with air-blowing, to remove water by mechanical means, in order to generate feed for the extruder. Suitable filter-press equipment is manufactured by Metso, FI-00130 Helsinki, Finland, FLSmidth, Valby, Denmark, and by Outotec. Rauhalanpuisto 9, 02230 Espoo, Finland.

In some instances, flocculant (or thickener, e.g. anionic polyacrylamide additive manufactured by Nalco Champion, 1 Ecolab Place, St. Paul, Minn. 55102-2233, USA) is added to optimise settling properties and underflow density. To optimise the procedure settling tests are carried out to measure settling rates and generate a settling curve, tracking underflow density with time.

Filtration may also be necessary depending on the filtration rate and resultant cake moisture. To optimise the procedure feed % solids (thickened/un-thickened), feed viscosity, pH and filtration pressure will be measured, Filter cloths are chosen after assessment of cake discharge and blinding performance. Suitable filter cloths are manufactured by Clear Edge Filtration, 11607 E 43rd Street North, Tulsa, Okla. 74116 USA.

In some circumstances a Decanter Centrifuge can be incorporated into the process design to concentrate the solids content prior to the filter press. Suitable equipment is manufactured by Alfa Laval Corporate AB, Rudeboksvagen 1, SE-226 55 Lund, Sweden.

Additional Processing

The purified coal product may be utilised in micronized particulate form, for example in cases where the product is mixed into a liquid oil to form a solid-liquid blend.

If further processing to produce a pellet or briquette is required, an extruder is used to compact the wet cake of microfine coal into solid shaped articles to provide mechanical integrity. Suitable pelletising extruder equipment is manufactured by Erich NETZSCH GmbH & Co. Holding KG, Gebrüder-Netzsch-Straße 19, 95100 Selb, Germany and by Bonnot Co., 1301 Home Avenue, Akron, Ohio 44310, USA.

The microfine coal wet cake is either fed to the extruder with or without an organic binder additive (such as starch, polyvinyl acetate powder, molasses, gum Arabic, lignosulphonates, carnauba wax, guar gum etc.) which are mixed with the wet cake to optimise pelletisation. The mixture is forced under pressure through a die, typically containing several circular or lozenge-shaped holes which determine the pellet diameter. The length of the pellets is then controlled by a simple cutting device.

Alternatively, a pin mixer or disc pelletiser can be used to form coal agglomerates. Suitable agglomerating equipment is manufactured by Feeco Int., 3913 Algoma Road, Green Bay, Wis. 54311-9707 USA The microfine coal wet cake is fed with or without organic binder into a pin mixer. The high-speed spinning action created by a single rotor shaft affixed with rods or pins thoroughly mixes the components and begins to form agglomerates as the material moves through the length of the mixer.

The microfine coal wet cake is fed with or without organic binder into a disc pelletizer which tumbles the material onto a rotating disc, with organic binding agent and feed being continuously added. The wet fines to become tacky and pick up additional fines as the material tumbles. Once pellets have coalesced to reach the desired size, uniform, round pellets exit the rotating disc via centrifugal force.

Alternatively, a roll-type briquette machine can be used to compact the wetcake into moulded briquettes. Suitable briquetting equipment is manufactured by K. R. Komarek Inc., 548 Clayton Ct., Wood Dale, Ill. 60191, USA The microfine coal wet cake is fed with or without an organic binder via a simple gravity type feeder, screw or auger type feeder which controls the mass of material passing between the rolls. The wetcake is squeezed by applying hydraulic pressure between two rolls rotating in opposite directions, typically one roll is fixed, the other is moveable, but restrained by hydraulic cylinders. Cavities or indentations cut into the surfaces of the rolls form the briquettes.

Alternatively, a compression moulding briquette machine can be used to compact the wetcake into moulded briquettes. Suitable briquetting equipment is manufactured by Ruf Maschinenbau GmbH & Co. KG, Hausener Str. 101, 86874 Zaisertshofen, Germany.

The microfine coal wet cake is loaded into the hopper of the briquetting machine with or without an organic binder and transported into a pre-charging chamber by a conveying screw. A pressing ram compresses the material into the mould and forms the briquette into its final shape and density. The reciprocating mould moves sideways and the briquette is ejected as the next briquette is formed.

Drying

The PCP product or demineralised coal pellets (coal agglomerates or coal briquettes) are then dried thermally to reduce water to below 5% m. by conveying them to a belt pellet dryer where oxygen-deprived hot process air is blown directly over the microfine coal pellets. Suitable equipment is manufactured by STELA Laxhuber GmbH, Ottingerstr. 2, D-84323 Massing, Germany or by GEA Group Aktiengesellschaft, Peter-Müller-Str. 12, 40468 Dusseldorf, Germany).

The pellets/briquettes (PCP) are assessed in terms of their material handling properties via several standard tests, e.g. impact resistance, abrasion resistance, crush resistance and water resistance.

Example 1—Preparation of Purified Coal Pellets by Extrusion

A sample with an ash content of 52.6% m taken from the underflow reject stream from a preparation plant processing a US medium-volatile bituminous coal was ground with a ball mill to achieve a grind size of $d_{80}$ 36 µm (i.e. 80% of the particles are below 36 µm in diameter) and screened at 100 µm. This was treated in a froth flotation apparatus with a few drops of MIBC as frother. Froth containing organic coal particles was collected, de-aerated and dewatered to 50 and 60% moisture; their resultant ash content was 7.6% m.

Using guar gum as binder, at proportions of 1.6, 4.0 1 nd 7.5% w/w, ultrafine coal was blended to form a slurry with a target viscosity of approximately 500,000 centipoises, then formed into pellets using an extruder manufactured by Netzsch. Pellets ranged from 10 to 25 mm in diameter, with lengths up to 50 mm. Feed slurry solids content ranged from 40 to 70% w/w. Pellets were then dried in an oven at 60-70° C.

Pellet assessment was conducted with tests for impact resistance and water resistance.

Impact resistance was measured using a variant of ASTM D440 Standard Test Method of Drop Shatter Test for Coal by dropping pellets from 2 m height on to a steel plate twice before measuring the pellet fragments. A much smaller sample size than the ASTM 440 recommended 23 kg was tested because insufficient sample was available. Pellets were tested in duplicate. Collected fragments were examined under a Zeiss Discovery.V8 stereo microscope and their size measured using Zeiss AxioVision software. Each pellet broke into 20-30 fragments, with fragment diameters ranging from 2 to 19 mm. The Ferret minimum diameters of the fragments were measured, and Ferret minimum diameters representing the sieve sizes specified in ASTM D440 were selected in order to produce a simulated sieve particle distribution of the fragments from PCP pellets prepared at different guar gum concentrations, which is illustrated in FIG. 2(a).

Figure 2B:
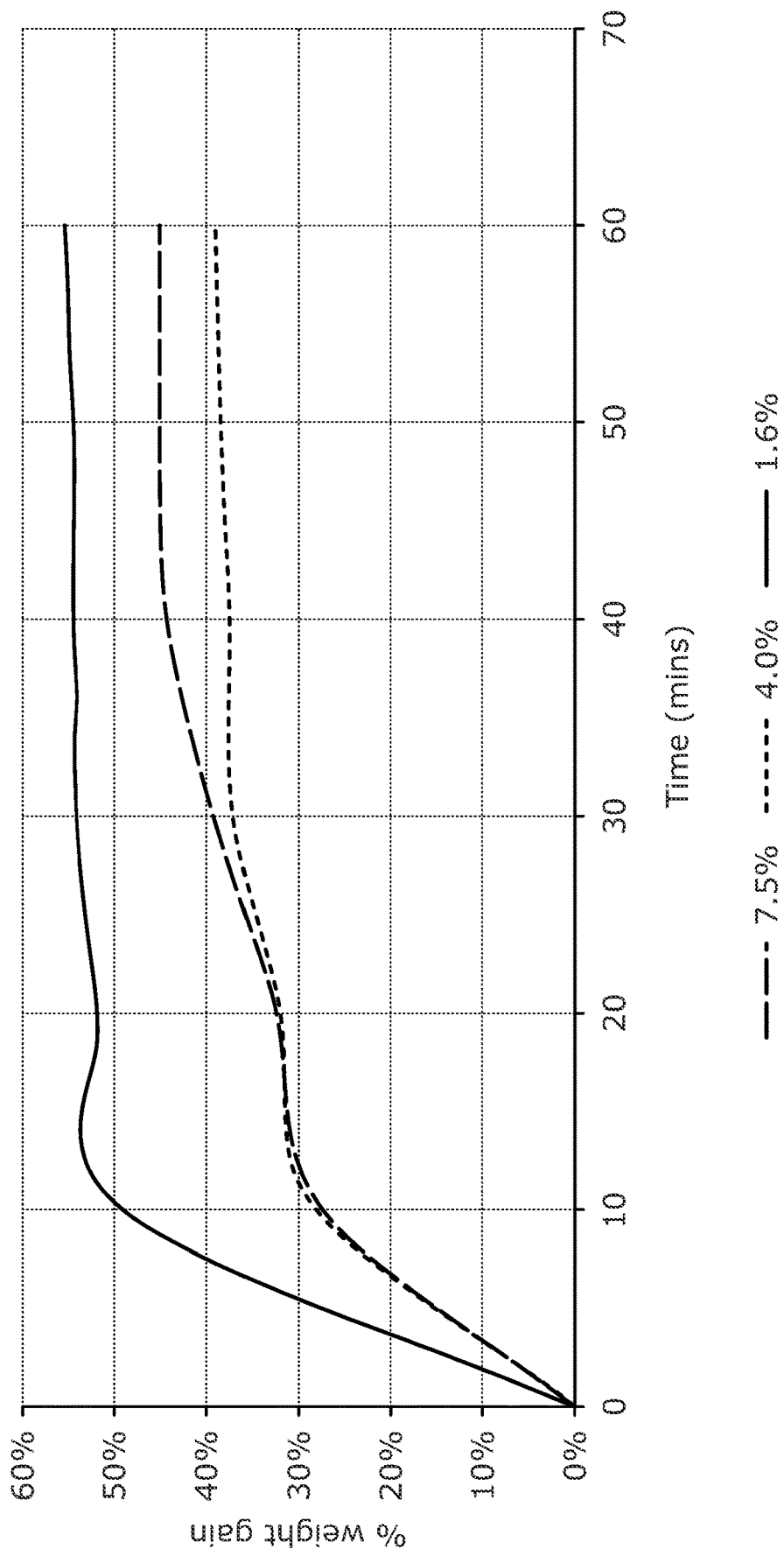
FIG. 2 shows (a) simulated sieve analysis of fragments from impact tests on PCP pellets for three different guar gum concentrations of 7.5% m, 4.0% m and 1.6% m (b) water uptake results for PCP pellets for three different guar gum concentrations of 7.5% m, 4.0% m and 1.6% m.

Water resistance was assessed by submerging pellets in water for up to 1 hour, with mass gain of the pellets measured and integrity of the pellets reviewed every 10 minutes. Pellets were dried and then a single test carried out at each concentration of guar gum. FIG. 2(b) shows water uptake results for PCP pellets at different guar gum concentrations.

The water resistance index was calculated (see for example Richards, S. R., Physical testing of Fuel Briquettes, Fuel Processing Technology, 25 (1990) 89-100):—

WRI=100–% by mass of water gain after 30 minutes. WRI values of 47% m, 63% m and 61% m were obtained for concentrations of 1.6, 4.0 and 7.5.

Example 2—Blending of Waste-Derived PCP with Low Grade Native Feedstock

Metallurgical coking coal is heated in an oxygen deficient environment to manufacture coke of sufficient strength and reactivity to be used as a reducing agent in smelting iron ore in a blast furnace. Special properties are required and the Australian Hard Coking Coal trading specifications are shown in Table 2 below (column 1). Coking coals have high value, approximately two times that of a high quality thermal coal. Furthermore, coking coals are in short supply globally.

Table 2 also shows the properties of a purified coal product (PCP) produced after upgrading two samples of waste derived during mining of a medium volatile bituminous coal A from Queensland, Australia: one taken from a tailings pond, the other from a coal processing plant thickener underflow waste stream. A thickener is a large circular tank that is used to dewater coal waste streams by enabling the solid material to settle out from water. Thickened slurry is pumped out of the bottom of the tank and the resultant thickener underflow is disposed of by pumping to a tailings pond or impoundment or other means.

economically. An example of such coal is the Late Permian Fort Cooper Coal Measures (FCCM), which form a sequence of 400-450 metres (gross thickness) throughout the Bowen Basin in Queensland, Australia. FCCM comprises coal seams interbedded with mineral tuffs and carbonaceous mudstone, and are subdivided into an upper Burngrove Formation, a lower Fair Hill Formation and a series of Middle Main Seams, including the Black Alley Shale (Ayaz, S. A., Rodrigues, S., Golding, S. D., Esterle, J. S., Compositional variation and palaeoenvironment of the volcanolithic Fort Cooper Coal Measures, Bowen Basin, Australia, International Journal of Coal Geology (2016), doi:10.1016/j.coal.2016.04.). These are high vitrinite-containing thick seams, typically >70% by volume, occurring in the same

TABLE 2

Upgrading of a Production Coal B to meet coking coal specifications by blending with purified coal replacement product (PCP) manufactured from production waste (Coal A)

|  |  | Australian Hard Coking Coal spec | Queensland Medium Volatile bituminous coal A | | | | 100% unblended with CRP | Production Coal B 50% blended with CRP | |
|---|---|---|---|---|---|---|---|---|---|
|  |  |  | Typical product | Ponded Tailings | | Thickener Underflow | | from Ponded Tailings | from Thickener underflow |
|  |  |  |  | As received | Upgraded to CRP | As received | Upgraded to CRP |  |  |  |
|  |  |  |  |  | Column Number |  |  |  |  |  |
|  |  | 1 | 2 | 3 | 4 | 5 | 6 | 7 | 8 | 9 |
| Total Moisture | % m, as received | 10 | 9.5 | 14.1 | 2.0 | 41.2 | 2.0 | 12 | 7 | 7 |
| Ash content | % m, air dried | 9.5 | 9.7 | 23.9 | 4.2 | 31.2 | 5.5 | 14 | 9.1 | 9.75 |
| Total Sulphur content | % m, air dried | 0.6 | 0.6 | n.d. | 0.5 | n.d. | 0.5 | 0.7 | 0.6 | 0.6 |
| Free Swelling | Index, min | 8 | 8.5 | 3.5 | 8 | 1 | 8.5 | 8 | 8 | 8.25 |
| Volatile Matter content | % m, air dried | 23 | 21 | 18 | 23 | 17 | 23 | 22 | 22.5 | 22.5 |
| Gieseler Fluidity | max dial divisions/min | 1000 | 350 | n.d. | 300 | n.d. | 350 | 3000 | 949 | 1025 |
| Phosphorus content | % m, air dried | 0.05 | 0.035 |  | 0.035 |  | 0.035 | 0.06 | 0.0475 | 0.0475 | n.d.—not determined

The properties of the waste streams themselves are shown in Table 2 (columns 3 and 5) and a typical native coal product from this mine (column 2) are also given.

By producing the PCP as described above, it is possible to achieve a quality specification significantly higher than the native coal from which it is derived. In this case, the ash, sulphur and moisture contents of 4.2-5.5% m, 0.5% m and 2% m for PCP from ponded tailings (column 4) and thickener underflow (column 6) respectively compare favourably with ash, sulphur and moisture contents of 9.7% m, 0.6% m and 9.5% m respectively for the typical production coal A (column 2). Such PCP meets all the specifications for Australian Hard Coking Coal excepting Gieseler fluidity (a measure of thermoplasticity) and, consequently, could be traded in the same way as the typical product coal A. Hence, by processing thickener underflow and/or ponded tailings to PCP, the production of high value coking coal A from this site can be increased significantly via increased efficiency of coal extraction.

A production coal B (column 7) exceeds the required specifications of Australian Hard Coking Coal (column 1) for several parameters, i.e. ash, sulphur, phosphorus and moisture contents. When coal B is blended equally (1:1) by mass with PCP manufactured from ponded tailings (column 8) or thickener underflow (column 9)—referred to as coal replacement product (CRP)—then all the specification parameters of the resultant blend meet the Australian Hard Coking Coal specification (column 1).

Example 3

Purified coal pellets can also be manufactured from high ash content inferior seam coal, hitherto not exploitable geological sequence and location as coking coal production mines (Permana, A. K., Ward C. R. and Gurba, L. W., Maceral Characteristics and Vitrinite Reflectance Variation of The High Rank Coals, South Walker Creek, Bowen Basin, Australia, Indonesian Journal of Geology, Vol. 8 No. 2 Jun. 2013: 63-74, http://oaknet/articles/2014/1150-1408500933.pdf)., nevertheless are uneconomic to process using conventional coal preparation methods, because of their ash contents are so high, in the range 40-60% m.

Feed samples derived from the FCCM measures in Queensland, Australia were screened at 1.7 mm size and the oversize crushed until it passes the 1.7 mm screen, then both <1.7 mm samples combined, blended and split into subsamples. A sub-sample with an ash content of 60.6% m dry basis was ground and separated in a float cell by several stages of grinding and dilution cleaning at successive particle sizes of $d_{80}=\sim40$ μm (test 1A), $d_{80}=\sim15$ μm (test 1B), $d_{80}=\sim10$ μm (test 1C) and $d_{80}=\sim5$ μm (test 1D). The results are given in the Table below. A second sample with an ash content of 75.4% m dry basis was treated similarly cleaning at successive particle sizes of $d_{80}=\sim30$ μm (test 2A), $d_{80}=\sim6$ μM (test 2B), $d_{80}=\sim5$ μm (test 2C).

Thus, purified coal with ash contents below 5% m have been prepared with moderate ($1^{st}$ sample) and very high ($2^{nd}$ sample) coal yields. Higher yields were obtained for the first sample at d80 values of 11 and 15 μm with ash contents of approximately 8% m. Such samples have low sulphur content (0.55-0.79% m) and show significant swelling properties (CSN 4-6).

TABLE 3

Yield and Analytical properties of purified coal fractions separated from coal waste using a successive grinding and dilution froth flotation technique.

| Test No. | Particle size ($d_{80}$) | Ash content (%, dry basis) | Sulphur content (%, dry basis) | Crucible Swelling No. (CSN) | Yield (% dry coal basis) |
|---|---|---|---|---|---|
| 1st FCCM sample: Ash content of feed = 60.6% m dry basis | | | | | |
| 1A | 43 | 13.9 | n.d. | 4.5 | 42 |
| 1B | 15 | 7.6 | 0.79 | 6 | 43 |
| 1C | 11 | 8.1 | 0.75 | 4 | 56 |
| 1D | 4.6 | 2.0 | 0.55 | n.d. | 36 |
| 2nd FCCM sample: Ash content of feed = 75.4% m dry basis | | | | | |
| 2A | 31 | 24.7 | n.d. | | 78 |
| 2B | 5.6 | 8.5 | | | 76 |
| 2C | 4.9 | 3.5 | | | 75 |
| Indian coal sample 1: Ash content of feed = 49.2% m dry basis | | | | | |
| 3A | 20.9 | 17.0 | n.d. | | 92 |
| 3B | 9.9 | 9.0 | | | 87 |
| 3C | 4.3 | 4.6 | | | 84 |

A sample of an Indian Permian age coal from Jharkhand state with an ash content of 49.2% m dry basis was treated similarly cleaning at successive particle sizes of $d_{80}$=~20 μm (test 3A), $d_{80}$=~10 μm (test 3B), $d_{80}$=~5 μm (test 3C). High (>80% m) coal yields were obtained at both $d_{80}$=~10 μm with ash content of just 9% m, and at $d_{80}$=~5 μm with an ash content below 5%.

TABLE 4

Petrographic properties of purified coal fractions separated from coal waste using a successive grinding and dilution froth flotation technique

| Sample | Vitrinite Random Reflectance (%) | Vitrinite (% vol) | Liptinite (% vol) | Inertinite (% vol) |
|---|---|---|---|---|
| 2C | 0.95 | 83 | 0 | 17 |
| 3C | 0.88 | 60 | 0 | 40 |

The vitrinite random reflectance values show that both coals were high volatile bituminous coals close to the coking coal range.

A. Pulverised Coal Injection (PCI)—Blending of PCPs

Pulverized Coal Injection (PCI) provides a supplemental carbon source into a blast furnace to speed up the production of metallic iron, reducing the need for coke production. As a result, energy use and emissions can be reduced. Such coals have special property requirements and high value: typically, approximately 50% more that of a high quality thermal coal.

Table 5 below shows the properties of PCP produced after upgrading a semi-anthracite from a South Wales waste tip (coal C) and a low-volatile bituminous coal from a US impoundment (coal D).

TABLE 5

Blending PCP from South Wales waste (coal C) and US waste (coal D) to meet PCI specifications

| | | Typical PCI specs | South Wales Coal C | | US Coal D | | 50% blend of CRPs from Coal C and Coal D |
|---|---|---|---|---|---|---|---|
| | | | As received from waste tip | Upgraded to CRP | As received from coal impoundment | Upgraded to CRP | |
| Coal property | Units | 1 | 2 | 3 | 4 | 5 | 6 |
| Moisture content | | 8-9 | 21.5 | 2 | 25 | 1.9 | 2 |
| Ash content | % air dried | 8-10 | 63.9 | 3.6 | 26 | 8.8 | 6 |
| Total Sulphur content | % air dried | 0.4-0.6 | n.d. | 0.7 | n.d. | 0.5 | 0.6 |
| Net Calorific Value | as received | 7000 | 2520 | 8220 | | 7720 | 7970 |
| Phosphorus content | % air dried | 0.04-0.08 | n.d. | 0.1 | | 0.01 | 0.055 |
| Volatile Matter content | % air dried | 14-16 | | 11 | | 18.2 | 15 | n.d. not determined

The properties of the waste streams themselves (columns 2 and 4), the upgraded PCP coal replacement product from each waste (columns 3 and 4), and an example of typical PCI trading specifications (column 1) are given. The resultant PCPs have properties close to the required PCI specification, except that the South Wales coal has sulphur and phosphorus content that is slightly too high for PCI use, and neither PCP fits the optimum volatile matter range. By mixing the two PCPs equally (1:1) by mass (column 6) the resultant blend properties all meet the PCI specification (column 1). Consequently, coal waste has been upgraded not only to a quality utilisable as thermal coal (Table 4), but to a higher value PCI coal product by blending from sources of different coal rank and quality.

B. Thermal Coals

Thermal coals are mainly used for power generation and are traded internationally according to regionally agreed specifications. Two such Australian trading specifications, one for Japan (column 1) and one for China (column 2), are shown in Table 6 below. Thermal coal for China trades typically at about US$20/tonne less than that for China, its lower price reflecting the lower quality requirements for ash content and calorific value.

TABLE 6

Increasing production of international thermal coal E by manufacturing PCP from thickener underflow waste

| | | Australian Thermal Coal specs | | NSW Thermal Coal E | | | Coal processed from seam F 50% blended with CRP |
|---|---|---|---|---|---|---|---|
| | | | | | Thickener Underflow | 100% | from |
| | | for Japan | for China | Typical product | As received | Upgraded to CRP | unblended with CRP | Thickener underflow |
| Coal property | Units | | | | Column Number | | | |
| | | 1 | 2 | 3 | 4 | 5 | 6 | 7 |
| Total Moisture | % max, as received | 15 | 15 | 9 | 66 | 2.0 | 20 | 11 |
| Ash content | % max, air dried | 15 | 24 | 9-12 | 52 | 3.8 | 26 | 14.9 |
| Total Sulphur content | % max, air dried | 0.75 | 0.75 | 0.6 | n.d. | 0.5 | 0.9 | 0.7 |
| Net Calorific Value | kcal/kg, min | 6000 | 5500 | 6900-7150 | 2300 | 7580 | 5000 | 6290 | n.a.—not available,
n.d.—not determined
Figures in parentheses are for Gross Calorific Value Table 6 shows the properties of PCP coal replacement product produced after upgrading high volatile bituminous coal from NSW, Australia, taken from a coal processing plant thickener underflow waste stream (column 5). The properties of the waste stream (column 4) and a typical product (column 3) from this mine are also given. Both the typical product coal E and the upgraded PCP meet both Australian specifications for Japan and China. Hence, by processing thickener underflow waste to PCP, the production of coal E from this site can be increased via increased efficiency of coal extraction.

After processing another coal seam, coal F, from this site gives lower quality than that required by either the Japanese or the Chinese Australian specifications: shortfalls in ash, moisture and sulphur contents, as well as calorific value (column 6) are obtained. If processed coal F is blended equally (1:1) by mass with PCP manufactured from waste coal E thickener underflow (column 7), then all the specification parameters of the resultant blend meet the Australian specifications for both Japan and China. Hence, by processing thickener underflow to PCP, the production of internationally tradeable coal from this site can be increased by including an additional coal seam of inferior quality on its own.

Example 4

US North Appalachian Thermal Coal trading specifications are given in Table 7 below (column 1).

Table 7 also shows the properties of PCP coal replacement product produced after upgrading high volatile bituminous coal from Kentucky, USA, coal G, taken from a coal impoundment (column 4). The properties of the waste stream (column 3) and a typical product (column 2) from this mining area are also given. The typical product coal and the upgraded PCP now meet both US North Appalachia specifications for thermal coal. Hence by processing coal waste stored in an impoundment to PCP, a product fit for use as a traded thermal coal can be produced.

TABLE 7

Upgrading coal impoundment waste to internationally tradeable thermal coal by manufacturing PCP of sufficient quality to upgrade a lower quality coal resource

| | | | US Appalacian Coal G | | | Coal H | |
|---|---|---|---|---|---|---|---|
| | | US North Appalacia specs | Typical Central Appalacia product | As received | Impoundment Upgraded to CRP | 100% unblended with CRP | 50% blend with CRP from impoundment |
| Coal property | Units | | | Column number | | | |
| | | 1 | 2 | 3 | 4 | 5 | 6 |
| Total Moisture | % max, as received | 15 | 5 | 60 | 2.0 | 24 | 13 |
| Ash content | % max, air dried | 8 | 8 | 47 | 4.9 | 10 | 7.5 |
| Total Sulphur content | | 2 | 1.2 | n.d. | 0.9 | 3.0 | 1.95 |
| Volatile Matter content | | 35 | 33 | | 33.5 | 36.5 | 35.0 |
| Net Calorific Value | kcal/kg, min, as received | 6700 | 7200 | 1600 | 7650 | 5800 | 6725 | n.a.—not available,
n.d.—not determined
Figures in parentheses are for Gross Calorific Value After processing, a coal (coal H) from another mining site gives lower quality than that required by US North Appalachian thermal coal specifications: shortfalls in ash, moisture, volatile matter and sulphur content, as well as calorific value (column 5) are obtained. If coal H is blended equally (1:1) by mass with PCP manufactured from coal G impoundment (column 6), then all the specification parameters of the resultant blend meet the US North Appalachian thermal coal specifications. Hence, by blending PCP from coal impoundment waste, a coal of inferior quality on its own can be upgraded to internationally tradeable coal standards.

Example 5

Blending Purified Coal Pellets into Coal Pulveriser Feed for Power Generation

Because of the complexities of a large coal-fired power plant, computer models have been developed to evaluate the technical and economic impacts of fuel quality changes based on operating experience. One such model is the Fuel Evaluation Tool developed by Uniper Technologies (www.uniper.energy—Uniper SE, Dusseldorf, Germany) which has been used to evaluate quantitatively the advantages of the purified coal product pellets (PCP) described herein. The entire power generation process is modelled, including fuel purchase and delivery, utilisation within the plant including impacts on efficiency, maintenance and availability, emissions, reagents and by-products. The Fuel Evaluation Tool is able to account for performance impacts on a typical modern power plant resulting from fuel quality changes.

Purified coal replacement product (Ash content 4.3%, Moisture 2.0%, Volatile Matter 35.8% Gross Calorific Value 33.2 MJ/kg, total Sulphur 0.8%, Chlorine 0.05%—all as received basis) has been evaluated for four power plant configurations typical for different regions, i.e. USA, Germany and two for India and compared with a variety of typically traded coal feeds from USA (Illinois, Appalachian and Powder River Basin), Colombia, Russia, South Africa, Indonesia and India; each power plant configuration is described by around 200 user inputs, the most important parameters for each power plant are shown in Table 8.

TABLE 8

Main model parameters for different Power Plant configurations

|  | US Coal | German Coal | Indian Coal | Indian Coal |
|---|---|---|---|---|
| Total Power Capacity, MW | 600 | 530 | 600 | 660 |
| Sent Out Power Capacity, MW | 535 | 500 | 555 | 614 |
| Gross Unit Efficiency, % | 36.3 | 40.1 | 34.6 | 38.5 |
| Net Unit Efficiency, % | 38.0 | 42.1 | 37.0 | 40.8 |
| Annual Generation, GWh | 2000 | 1752 | 3645 | 4030 |
| Capacity Factor, % | 40% | 40% | 75% | 75% |
| Equivalent Availability, % | 91.0 | 90.0 | 84.0 | 90.0 |
| Lost Generation Cost, $/MWh | 12.0 | 12.0 | 10.0 | 10.0 |
| Ops & Maintenance, $/MWh | 2.5 | 2.7 | 2.2 |  |
| Design Coal | US Illinois | South African | Indian G-13 | Indian G-10 |
| Number of coal mills installed | 6 | 4 | 8 | 6 |
| Capacity of each coal mill, t/h | 45 | 45 | 58 | 65 |
| Mill safety systems | Expl. vents | Suppression | Expl. vents | Suppression |
| Boiler $NO_x$ produced, mg/$Nm^3$ | 650 | 440 | 650 | 650 |
| Selective Catalytic Reduction | Yes | Yes | No | No |
| $NO_x$ emissions, mg/$Nm^3$/removal | 80% | 200 | — | — |
| Electrostatic Precipitator installed | Yes | Yes | Yes | Yes |
| Particulate Matter limit mg/$Nm^3$ | 10 | 15 | 150 | 150 |
| Flue Gas Desulphurisation installed | Yes | Yes | No | No |
| $SO_2$ emissions, mg/$Nm^3$/removal | 92% | 200 | — | — |

Figure 3:
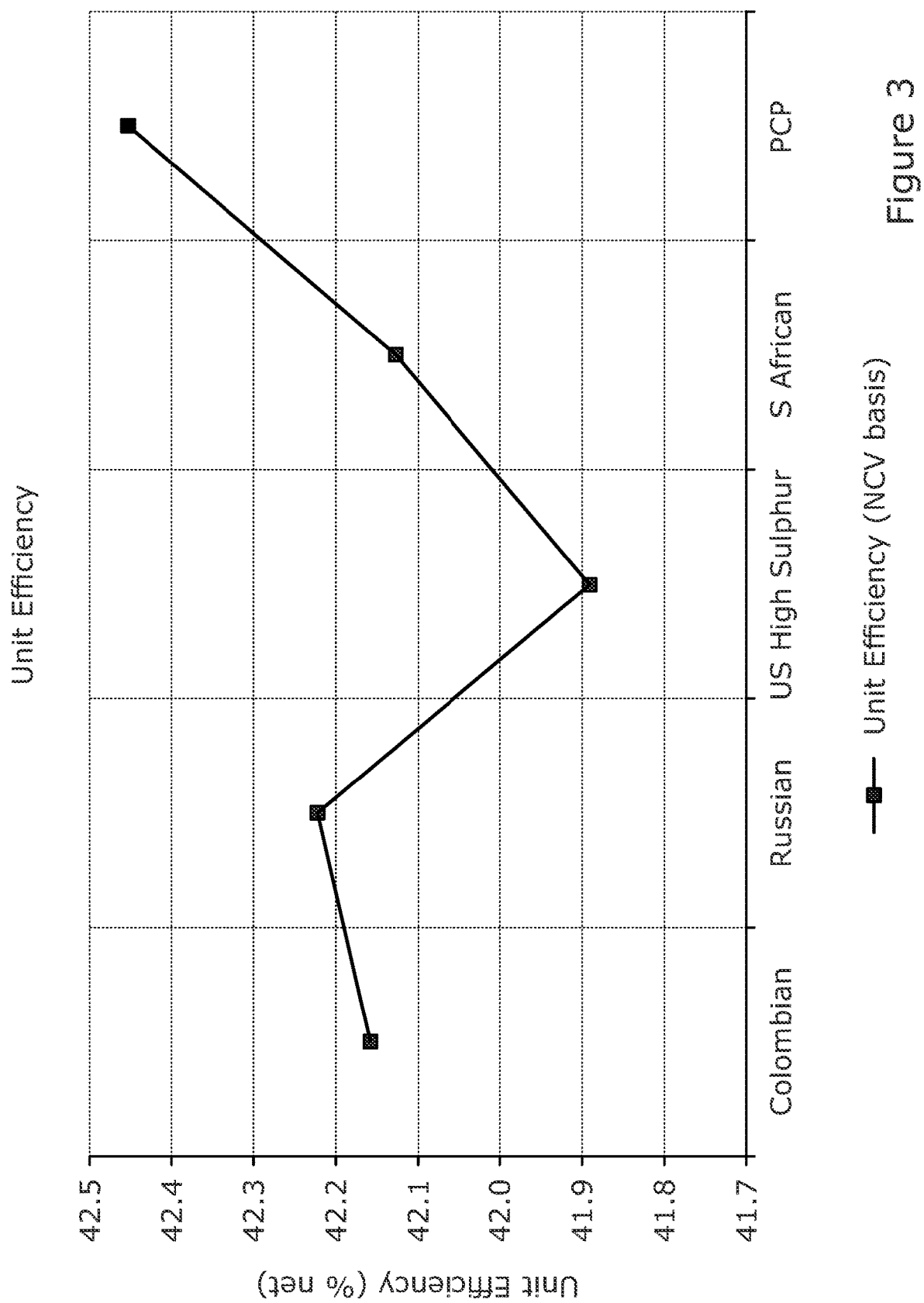
FIG. 3 shows a graph of calculated net power efficiency in a German coal-fired power plant by way of comparison between the blended coal product (referred to as purified coal product—PCP) is compared to reference coals from a variety of countries.

Total power plant (unit) efficiency is mainly determined by three of the factors previously discussed: boiler efficiency, auxiliary power demand and steam temperatures (turbine efficiency). It has been shown that PCP is will have a beneficial impact on both boiler efficiency and auxiliary power demand, and that this will result in higher unit efficiency when firing the pellets. FIG. 3 shows the calculated efficiency for the German hard coal power plant (NCV unit efficiency is shown). The significant improvement in unit efficiency compared with Colombian, Russian, US high sulphur and South African coals leads to a direct reduction in coal consumption per MWh of electricity generated. This delivers cost savings and $CO_2$ reduction through the entire power generation process.

Improving coal quality will also deliver reductions in plant maintenance requirements. Wear and tear within the coal plant and milling systems will be much improved, as fewer tonnes of coal are required per unit electricity production, and because PCP and PCP containing blends are a consistent high-quality fuel. It is also fairly common for some coals to be contaminated with tramp materials, such as rocks or metals. These tramp materials can have a disproportionate effect on wear rates, especially within mills. Operations and maintenance savings are also expected for the Flue Gas Desulphurisation plant, where fewer tonnes of reagent and by-product need to be processed. Likewise, costs for ash handling will be significantly reduced for PCP, e.g. the number of lorries moving ash from the power plant to the end-user or disposal site will be greatly reduced.

Unit availability refers to the ability to deliver electricity to the grid when demanded. If a problem occurs on plant the unit may need to completely shut down for repair (a 'forced outage') or the unit may continue operating, but at reduced power output ('forced derate'). Both instances represent a loss of availability, and there is usually a cost associated with this, since the opportunity to make money by selling power is lost. In the four studies performed using the Fuel Evaluation Tool a number of major technical problems have been highlighted which would lead to availability losses for the power plant concerned. PCP is expected to lead to lower rates of forced derate and forced outage. The plant areas where unit availability is expected to be improved are for mills, boiler (lower tube failure due to corrosion, erosion, sootblower erosion etc), ash handling plant and FGD plant.

Although particular embodiments of the invention have been disclosed herein in detail, this has been done by way of example and for the purposes of illustration only. The aforementioned embodiments are not intended to be limiting with respect to the scope of the invention. It is contemplated by the inventors that various substitutions, alterations, and modifications may be made to the invention without departing from the spirit and scope of the invention.

The invention claimed is:

1. A process for upgrading of a coal product comprising the steps of:
   (i) providing a pelletized coal product comprising a purified coal composition, wherein the purified coal composition is in the form of solid micronized particles, wherein at least about 90% by volume (% vol) of the solid micronized particles are no greater than about 500 μm in diameter and further comprise at most 4% m ash, at most 25 m % water and at most 0.5 m % above the native organic Sulphur content; and
   (ii) combining the purified coal composition with a solid coal feedstock, in order to create a combined solid-solid blend upgraded coal product.

2. The process of claim 1, wherein the pelletized coal product comprises less than 10% m of water.

3. The process of claim 1, wherein the pelletized coal product comprises at most about 0.05% m chlorine.

4. The process of claim 1, wherein the solid coal feedstock is selected from one or more of the group consisting of: coking coal; pulverised coal injection coal (PCI); thermal coal; inferior coal; and coal pulverised feed.

5. The process of claim 1, wherein the combined solid-solid blend comprises at most any one of: 1% m, 5% m, 10% m, 20% m, 30% m, 40% m, 50%, 60% m, 70% m, 80% m, 90% m, 95% m and 99% m of the purified coal composition based on the total mass of the combined solid-solid blend, with the balance comprised of solid coal feedstock from single or multiple sources.

6. The process of claim 1, wherein the combined solid-solid blend comprises at least 0.01% m and at most 99% m of the purified coal composition, with the balance comprised of solid coal feedstock from a single source based on the total mass of the combined solid-solid blend.

7. The process of claim 1, wherein the combined solid-solid blend comprises at least 0.01% m and at most 99% m of the purified coal composition, with the balance comprised of solid coal feedstock from multiple sources based on the total mass of the combined solid-solid blend.

8. The process of claim 1, wherein the combined solid-solid blend upgraded coal product comprises one or more of:
   at least 1% m, 2% m, 3% m or 4% m; and at most 6% m, 7% m, 8% m or 10% m ash;
   at least 0.1% m, or 0.2% m; and at most 0.5% m;1.5% m, 3% m, or 5% m of additional mineral sulphur above the native organic sulphur content; and
   at least 2% m, 3% m or 4% m; and at most 9% m, 12% m, 15% m, 20% or 25% m water;
   based on the total mass of the product.

9. A process for upgrading of a coal product comprising the steps of:
   a) providing a first purified coal composition from a first source of coal fines, wherein the composition is in the form of solid particles that are compacted into pellets, wherein at least about 90% by volume (% vol) of the solid particles are no greater than about 500 μm in diamete, and further comprise at most 4% m ash, at most 25 m % water and at most 0.5 m % above the native organic Sulphur content;
   b) providing a second purified coal composition from a second source of coal fines different from the first source, wherein the second composition is in the form of solid particles that are compacted into pellets, and wherein at least about 90% by volume (% vol) of the solid particles are no greater than about 500 μm in diameter; and
   c) combining the first and second compositions in order to create a combined solid-solid pelletized blended upgraded coal product.

10. The process of claim 9, wherein the combined solid-solid blend upgraded coal product comprises one or more of:
    at least about 1% m, 2% m, 3% m or 4% m; and at most about 6% m, 7% m, 8% m or 10% m ash;
    at least about 0.1% m, or 0.2% m; and at most about 0.5% m;1.5% m, 3% m, or 5% m of additional mineral sulphur above the native organic sulphur content; and
    at least about 2% m, 3% m or 4% m; and at most about 9% m, 12% m, 15% m, 20% or 25% m water;
    based on the total mass of the product.

11. A pelletized coal product comprising a purified coal composition in combination with a solid coal feedstock, wherein the purified coal composition is in the form of micronized particles and is further characterised in that at least 95% by volume (% v) of the purified coal composition particles are no greater than 500 μm in diameter and further comprise at most 4% m ash, at most 25 m % water and at most 0.5 m % above the native organic Sulphur content, and wherein the pelletized coal product comprises at most 80% by mass (% m) of purified coal composition, based on the total weight of the blended coal product.

12. The coal product of claim 11, wherein the blended coal product comprises a purified coal composition in which typically at least 95% v, optionally at least 98% v, and suitably at least 99% v of the particles are no greater than about 250 μm in diameter.

13. The coal product of claim 11, wherein the blended coal product comprises a purified coal composition in which typically at least 95% v, optionally at least 98% v, and suitably at least 99% v of the particles are no greater than about 100 μm in diameter.

14. A process for upgrading of a coal product comprising the steps of:
    (i) providing a purified coal composition, wherein the composition is in the form of solid particles, and wherein at least about 95% by volume (% vol) of the solid particles are no greater than about 100 μm in diameter, and wherein the composition comprises less than 5% m ash and less than 10% m of water and at most 0.5 m % above the native organic Sulphur content; and
    (ii) combining the purified coal composition with a solid coal feedstock, in order to create a combined solid-solid blend upgraded coal product.

15. The process of claim 14, wherein the purified coal composition is formed into pellets comprised of the solid particles.

16. The process of claim 14, wherein the solid coal feedstock is selected from one or more of the group consisting of: coking coal; pulverised coal injection coal (PCI); thermal coal; inferior coal; and coal pulverised feed.

17. The process of claim 14, wherein the combined solid-solid blend comprises at most about 90% m of the purified coal composition based on the total mass of the combined solid-solid blend, with the balance comprised of solid coal feedstock from single or multiple sources.

18. The process of claim 14, wherein the combined solid-solid blend comprises at least about 1% m of the purified coal composition, with the balance comprised of solid coal feedstock from a single source based on the total mass of the combined solid-solid blend.

\* \* \* \* \*